US012690015B2

(12) United States Patent
Niu et al.

(10) Patent No.: US 12,690,015 B2
(45) Date of Patent: Jul. 21, 2026

(54) RESOURCE DETERMINATION METHOD AND APPARATUS, NODE AND STORAGE MEDIUM

(71) Applicant: ZTE CORPORATION, Shenzhen (CN)

(72) Inventors: Li Niu, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 489 days.

(21) Appl. No.: 17/783,421

(22) PCT Filed: Apr. 12, 2021

(86) PCT No.: PCT/CN2021/086702
§ 371 (c)(1),
(2) Date: Jun. 8, 2022

(87) PCT Pub. No.: WO2021/204297
PCT Pub. Date: Oct. 14, 2021

(65) Prior Publication Data
US 2023/0011377 A1     Jan. 12, 2023

(30) Foreign Application Priority Data
Apr. 10, 2020     (CN) .......................... 202010280195.5

(51) Int. Cl.
*H04W 72/02* (2009.01)
*H04L 1/08* (2006.01)
(Continued)

(52) U.S. Cl.
CPC .............. *H04W 72/02* (2013.01); *H04L 1/08* (2013.01); *H04W 72/0453* (2013.01); *H04W 72/56* (2023.01)

(58) Field of Classification Search
CPC . H04W 72/02; H04W 72/56; H04W 72/0453; H04L 1/08
See application file for complete search history.

(56) References Cited

U.S. PATENT DOCUMENTS

| | | | |
|---|---|---|---|
| 9,742,546 B2 * | 8/2017 | Seo ..................... | H04W 52/243 |
| 10,469,218 B2 * | 11/2019 | Li ......................... | H04L 5/0032 |

(Continued)

FOREIGN PATENT DOCUMENTS

| | | | | |
|---|---|---|---|---|
| BR | 112020006516 A2 * | 9/2020 | ......... | H04B 7/18506 |
| CN | 103249134 A * | 8/2013 | | |

(Continued)

OTHER PUBLICATIONS

3GPP Technical Specification Group Radio Access Network. "Discussion on Configured Grants in NR-Unlicensed," 3GPP TSG RAN WG1 Meeting #93, May 21-25, 2018, pp. 1-4.

(Continued)

*Primary Examiner* — Shean Tokuta
(74) *Attorney, Agent, or Firm* — Vivacqua Crane, PLLC

(57) ABSTRACT

A resource determination method and apparatus, a node and a non-transitory computer-readable storage medium are disclosed. The method may include: acquiring, by a first communication node, configuration information configured by a second communication node; and selecting, by the first communication node, a target resource among a plurality of pre-configured resources according to the configuration information, where the pre-configured resources are time and frequency domain resources configured by the second communication node.

8 Claims, 9 Drawing Sheets

(51) Int. Cl.
    *H04W 72/0453*    (2023.01)
    *H04W 72/56*    (2023.01)

(56) References Cited

U.S. PATENT DOCUMENTS

| | | | | |
|---|---|---|---|---|
| 10,623,946 B1 * | 4/2020 | Kumar | H04W 76/16 | |
| 12,185,288 B2 * | 12/2024 | Zhao | H04W 72/04 | |
| 2011/0195724 A1 * | 8/2011 | Lee | H04W 72/541 | |
| | | | 455/456.1 | |
| 2012/0087266 A1 * | 4/2012 | Vajapeyam | H04W 72/54 | |
| | | | 370/252 | |
| 2012/0094679 A1 * | 4/2012 | Rao | H04W 48/16 | |
| | | | 455/450 | |
| 2015/0173086 A1 * | 6/2015 | Karaman | H04W 84/22 | |
| | | | 370/254 | |
| 2015/0296357 A1 * | 10/2015 | Hooli | H04W 72/27 | |
| | | | 455/404.1 | |
| 2015/0327286 A1 * | 11/2015 | Yiu | H04W 72/27 | |
| | | | 370/328 | |
| 2016/0234756 A1 * | 8/2016 | Alanen | H04W 74/08 | |
| 2017/0202006 A1 * | 7/2017 | Rao | H04W 72/542 | |
| 2019/0059079 A1 * | 2/2019 | Lin | H04W 72/0466 | |
| 2019/0075581 A1 | 3/2019 | Salem et al. | | |
| 2019/0268919 A1 * | 8/2019 | Shi | H04W 72/566 | |
| 2020/0068546 A1 | 2/2020 | Wu et al. | | |
| 2020/0389916 A1 * | 12/2020 | Salem | H04W 74/006 | |
| 2020/0396621 A1 * | 12/2020 | Park | H04W 24/02 | |
| 2021/0029686 A1 * | 1/2021 | Lin | H04W 24/08 | |
| 2021/0195430 A1 | 6/2021 | You et al. | | |
| 2021/0219268 A1 * | 7/2021 | Li | H04W 72/02 | |
| 2021/0243773 A1 * | 8/2021 | Osawa | H04L 5/0053 | |
| 2021/0274543 A1 * | 9/2021 | Ryu | H04W 72/56 | |
| 2021/0352644 A1 | 11/2021 | Zhou | | |
| 2021/0409159 A1 | 12/2021 | Zhu et al. | | |
| 2022/0015116 A1 | 1/2022 | Chen et al. | | |
| 2022/0174695 A1 * | 6/2022 | Lee | H04L 1/1896 | |
| 2022/0248383 A1 * | 8/2022 | Park | H04W 72/27 | |
| 2023/0011377 A1 * | 1/2023 | Niu | H04W 72/23 | |

FOREIGN PATENT DOCUMENTS

| | | | | | |
|---|---|---|---|---|---|
| CN | 103385023 A | * | 11/2013 | | H04W 36/304 |
| CN | 106488565 A | * | 3/2017 | | H04W 72/52 |
| CN | 109496398 A | | 3/2019 | | |
| CN | 109496400 A | | 3/2019 | | |
| CN | 110798866 A | | 2/2020 | | |
| CN | 110891314 A | | 3/2020 | | |
| CN | 110971360 A | | 4/2020 | | |
| CN | 111901872 A | * | 11/2020 | | H04W 72/56 |
| CN | 113993220 A | * | 1/2022 | | H04W 72/569 |
| CN | 111901872 B | * | 10/2025 | | H04W 72/0453 |
| CN | 121334845 A | * | 1/2026 | | |
| EP | 2941930 B1 | * | 9/2018 | | H04W 72/27 |
| KR | 20110031135 A | * | 3/2011 | | H04W 74/0816 |
| KR | 20220137372 A | * | 10/2022 | | H04W 28/26 |
| VN | 10017955 B | * | 1/2018 | | |
| WO | WO-2017036297 A1 | * | 3/2017 | | H04W 72/52 |
| WO | WO-2017186308 A1 | * | 11/2017 | | H04W 84/18 |
| WO | 2019047786 A1 | | 3/2019 | | |
| WO | WO-2019096386 A1 | * | 5/2019 | | H04W 72/542 |
| WO | WO-2019224893 A1 | * | 11/2019 | | H04W 72/56 |
| WO | WO-2020011253 A1 | * | 1/2020 | | H04L 5/0005 |
| WO | 2020034573 A1 | | 2/2020 | | |
| WO | WO-2020033088 A1 | * | 2/2020 | | H04W 72/02 |
| WO | 2020063408 A1 | | 4/2020 | | |
| WO | WO-2020204567 A1 | * | 10/2020 | | H04L 1/188 |

OTHER PUBLICATIONS

International Searching Authority. International Search Report and Written Opinion for PCT Application No. PCT/CN2021/086702 and English translation, mailed Jul. 8, 2021, pp. 1-13.

Intellectual Property India. Examination Report for IN Application No. 202227050644 and English translation, mailed Oct. 10, 2023, pp. 1-8.

3GPP Technical Specification Group Radio Access Network. "Transmission with configured grant in NR unlicensed band," 3GPP TSG RAN WG1 Meeting #94bis, Oct. 2018, pp. 1-9.

European Patent Office. Partial Supplementary European Search Report for EP Application No. 21784696.3, mailed Mar. 14, 2024, pp. 1-19.

The State Intellectual Property Office of People's Republic of China. First Office Action for CN Application No. 202010280195.5 and English translation, mailed Nov. 21, 2024, pp. 1-10.

The State Intellectual Property Office of People's Republic of China. First Search Report for CN Application No. 202010280195.5 and English translation, mailed Nov. 18, 2024, pp. 1-6.

3GPP Technical Specification Group Radio Access Network. "Transmission with configured grant in NR unlicensed band," 3GPP TSG RAN WG1 Meeting #99, Nov. 2019, pp. 1-17.

Korean Intellectual Property Office. First Office Action for KR Application No. 10-2022-7019599 and English translation, mailed Sep. 30, 2024, pp. 1-13.

* cited by examiner

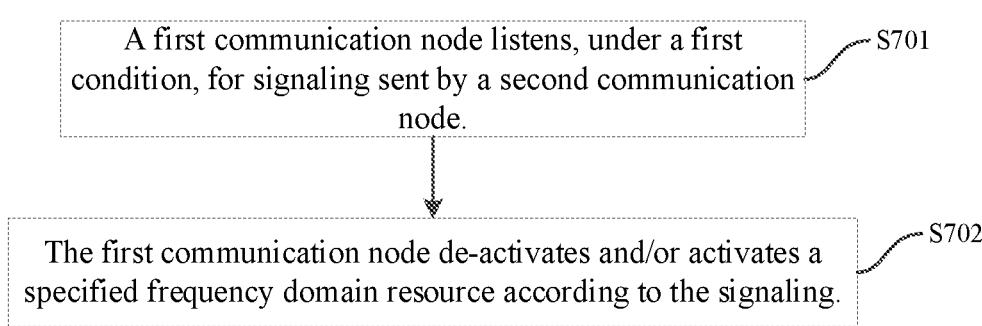

A first communication node listens, under a first condition, for signaling sent by a second communication node.    ⟋ S701

The first communication node de-activates and/or activates a specified frequency domain resource according to the signaling.    ⟋ S702

Fig. 7

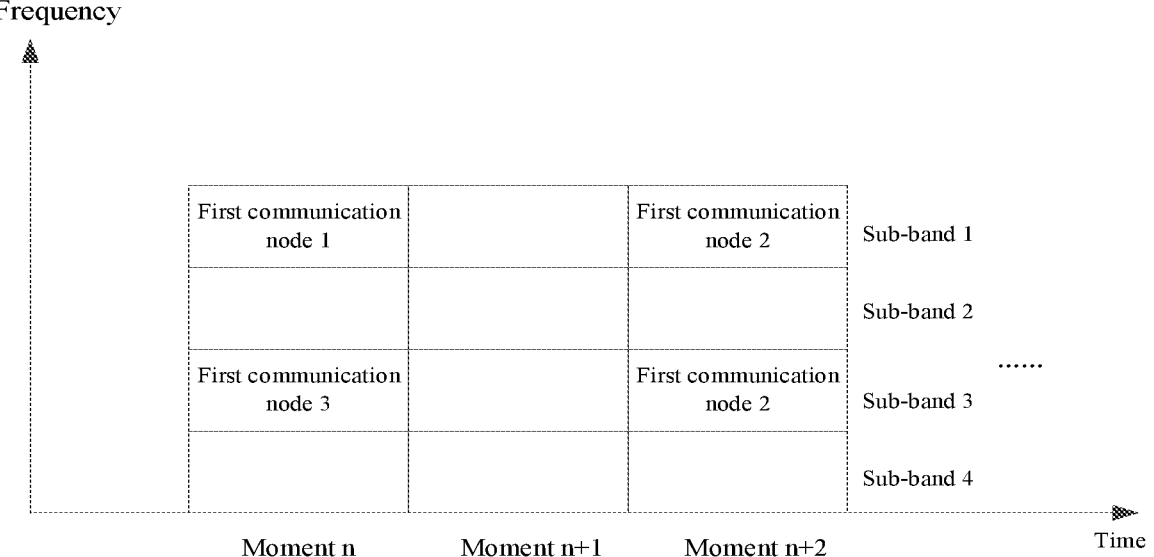

Fig. 8

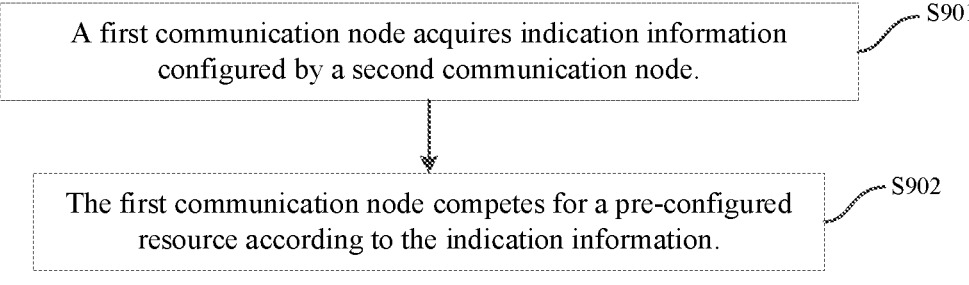

A first communication node acquires indication information configured by a second communication node.    ⟋ S901

The first communication node competes for a pre-configured resource according to the indication information.    ⟋ S902

Fig. 9

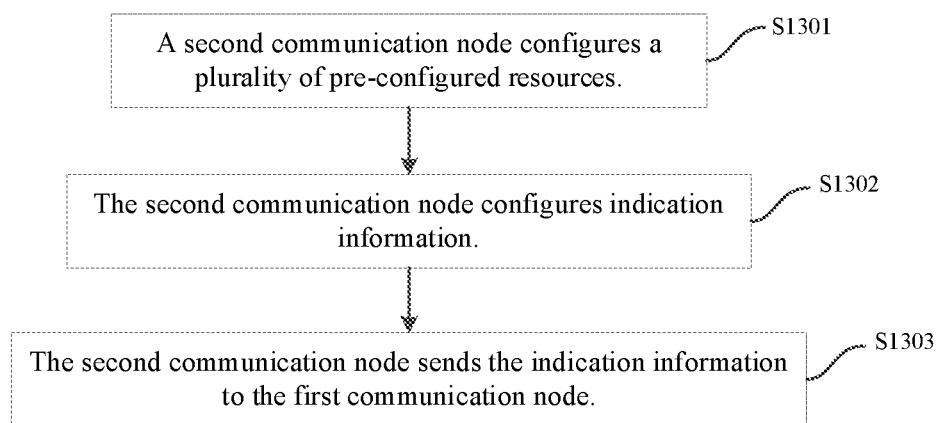

A second communication node configures a plurality of pre-configured resources.          ⟋ S1301

The second communication node configures indication information.          ⟋ S1302

The second communication node sends the indication information to the first communication node.          ⟋ S1303

Fig. 13

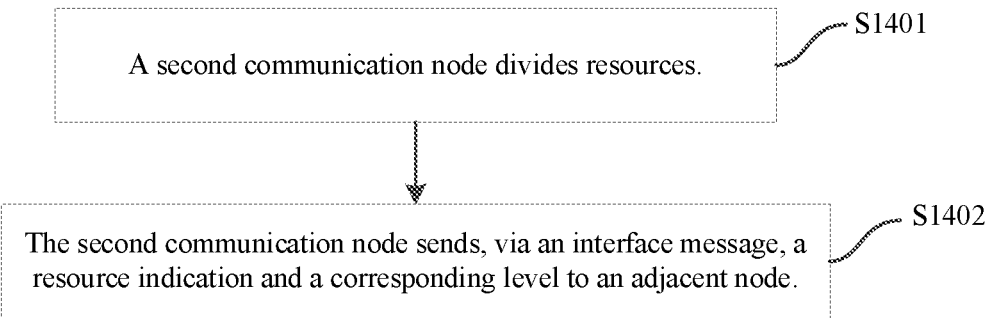

A second communication node divides resources.          ⟋ S1401

The second communication node sends, via an interface message, a resource indication and a corresponding level to an adjacent node.          ⟋ S1402

Fig. 14

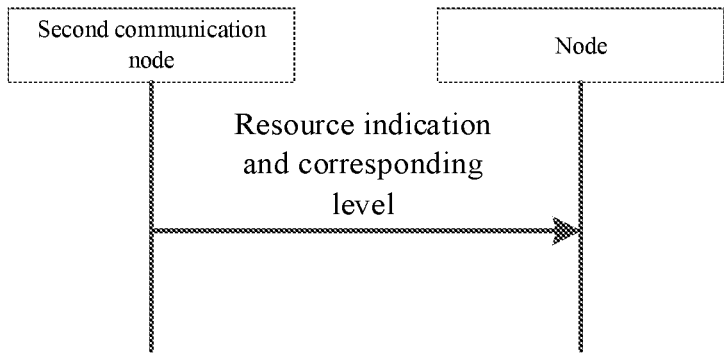

Second communication node

Node

Resource indication and corresponding level

RESOURCE DETERMINATION METHOD AND APPARATUS, NODE AND STORAGE MEDIUM

CROSS-REFERENCE TO RELATED APPLICATION

This application is a national stage filing under 35 U.S.C. § 371 of international application number PCT/CN2021/086702, filed Apr. 12, 2021, which claims priority to Chinese patent application No. 202010280195.5, filed on Apr. 10, 2020. The contents of the international application are incorporated herein by reference in their entirety.

TECHNICAL FIELD

The present disclosure relates to the technical field of communications, and in particular to a resource determination method and apparatus, a node, and a non-transitory computer-readable storage medium.

BACKGROUND

The unlicensed spectrum is a shared spectrum, and terminal devices need to obtain channel access grant in a competition mechanism to use the spectrum. In this case, when there are many terminal devices, the terminal devices may not be able to preempt the channel, which makes it uncertain to send data on the unlicensed spectrum, or the terminal devices may be delayed for a period of time before it preempts the channel, which leads to the delay of data transmission. In order to ensure some services (e.g., Ultra Reliable Low Latency Communications (URLLC)) with strict latency requirements and to reduce the time for scheduling, the base station may adopt a pre-configuration method to assign fixed time and frequency domains for the terminal devices. As shown in FIG. 1, the base station assigns resources with a certain period and a certain bandwidth to the terminal device. When uplink data arrives at the terminal device, the configured resources may be directly used to send the uplink data. However, when an unlicensed spectrum is used to transmit a service with strict latency requirements, there is still a problem of increasing service latency due to the existence of the competition mechanism even if the pre-configuration method is adopted.

The current solution is to improve the success probability of nodes to preempt channels. As shown in FIG. 2, the base station pre-configures resources in multiple frequency domains, and when there is transmission of data, terminal devices compete on the multiple frequency domains at the same time, and in which frequency domain the competition is successful, the transmission will be conducted in which frequency domain, but this will occupy multiple spectrum resources, thus resulting in waste of spectrum resources.

SUMMARY

An embodiment of the present disclosure provides a resource determination method, which may include: acquiring, by a first communication node, configuration information configured by a second communication node; and selecting, by the first communication node, a target resource among a plurality of pre-configured resources according to the configuration information, where the pre-configured resources are time and frequency domain resources configured by the second communication node.

An embodiment of the present disclosure provides a resource determination method, which may include: listening, by a first communication node under a first condition, for signaling sent by a second communication node; and de-activating and/or activating, by the first communication node, a specified resource according to the signaling.

An embodiment of the present disclosure provides a resource determination method, which may include: acquiring, by a first communication node, indication information configured by a second communication node; and competing, by the first communication node, for a pre-configured resource according to the indication information.

An embodiment of the present disclosure provides a resource determination method, which may include: configuring, by a second communication node, a plurality of pre-configured resources, the pre-configured resources being configured time and frequency domain resources; configuring, by the second communication node, configuration information; and sending, by the second communication node, the configuration information to a first communication node, where the configuration information is used to instruct the first communication node to select a target resource among the plurality of pre-configured resources according to the configuration information.

An embodiment of the present disclosure provides a resource determination method, which may include: configuring, by a second communication node, a plurality of pre-configured resources; and sending, by the second communication node, signaling to a first communication node, where the first communication node is a node configured on the pre-configured resources, and the signaling is configured to instruct the first communication node to de-activate and/or activate a specified resource.

An embodiment of the present disclosure provides a resource determination method, which may include: configuring, by a second communication node, a plurality of pre-configured resources; configuring, by the second communication node, indication information; and sending, by the second communication node, the indication information to a first communication node, where the indication information is used to instruct the first communication node to compete for a frequency domain resource among the plurality of pre-configured resources according to the indication information.

An embodiment of the present disclosure provides a resource determination method, which may include: dividing resources by a second communication node; and sending, by the second communication node via an interface message, a resource indication and a corresponding level to an adjacent node, where the adjacent node is a node of the same type as the second communication node.

An embodiment of the present disclosure provides a resource determination method, which may include: receiving, by a node via an interface message, a resource indication and a corresponding level sent by a second communication node, where the node is a node of the same type as the second communication node; and dividing, by the node, resources of the node according to the resource indication and the corresponding level.

An embodiment of the present disclosure provides a resource determination apparatus, which may include: an acquisition module configured to acquire configuration information configured by a second communication node; and a selection module configured to select a target resource among a plurality of pre-configured resources according to the configuration information, where the pre-configured resources are time and frequency domain resources configured by the second communication node.

An embodiment of the present disclosure provides a resource determination apparatus, which may include: a configuration module configured to configure a plurality of pre-configured resources, the pre-configured resources being time and frequency domain resources, where the configuration module is further configured to configure configuration information; and a communication module configured to send the configuration information to a first communication node, where the configuration information is used to instruct the first communication node to select a target resource among the plurality of pre-configured resources according to the configuration information.

An embodiment of the present disclosure provides a resource determination apparatus, which may include: a configuration module configured to configure a plurality of pre-configured resources; and a communication module configured to send signaling to a first communication node, where the first communication node is a node configured on the pre-configured resources, and the signaling is configured to instruct the first communication node to de-activate and/or activate a specified resource.

An embodiment of the present disclosure provides a resource determination apparatus, which may include: a configuration module configured to configure a plurality of pre-configured resources, where the configuration module is further configured to configure indication information; and a communication module configured to send the indication information to a first communication node, where the indication information is used to instruct the first communication node to compete for a frequency domain resource among the plurality of pre-configured resources according to the indication information.

An embodiment of the present disclosure provides a resource determination apparatus, which may include: a division module configured to divide resources; and a communication module configured to send, via an interface message, a resource indication and a corresponding level to an adjacent node, where the adjacent node is a node of the same type as the resource determination apparatus.

An embodiment of the present disclosure provides a resource determination apparatus, which may include: a communication module configured to receive, via an interface message, a resource indication and a corresponding level sent by a second communication node, where the second communication node is a node of the same type as the resource determination apparatus; and a division module configured to divide resources of the resource determination apparatus according to the resource indication and the corresponding level.

An embodiment of the present disclosure provides a node, which may include: a memory, a processor, and a computer program stored in the memory and executable by the processor, where the processor, when executing the computer program, implements a resource determination method provided in an embodiment of the present disclosure.

An embodiment of the present disclosure provides a node, which may include: a memory, a processor, and a computer program stored in the memory and executable by the processor, where the processor, when executing the computer program, implements a resource determination method provided in an embodiment of the present disclosure.

An embodiment of the present disclosure provides a non-transitory computer-readable storage medium storing a computer program, where the computer program, when executed by a processor, causes the processor to implement a resource determination method provided in an embodiment of the present disclosure.

An embodiment of the present disclosure provides a non-transitory computer-readable storage medium storing a computer program, where the computer program, when executed by a processor, causes the processor to implement a resource determination method provided in an embodiment of the present disclosure.

The above embodiments and other aspects and the implementations thereof in the present disclosure are further described in the brief description of drawings, detailed description, and claims.

BRIEF DESCRIPTION OF DRAWINGS

FIG. 7 is a flowchart of a resource determination method provided by an embodiment;

FIG. 8 is a schematic diagram of a case where a plurality of first communication nodes are configured on the same frequency domain and on the same or different time domains;

FIG. 9 is a flowchart of a resource determination method provided by an embodiment;

FIG. 13 is a flowchart of a resource determination method provided by an embodiment;

FIG. 14 is a flowchart of a resource determination method provided by an embodiment;

FIG. 15 is a schematic diagram of interaction between nodes provided by an embodiment;

DETAILED DESCRIPTION

In order to make the purposes, technical schemes and advantages of the present disclosure clear, the embodiments of the present disclosure will be described hereinafter in detail with reference to the accompanying drawings. It should be noted that any combinations of embodiments and features of the embodiments of the present disclosure without conflict are possible.

In addition, in the embodiments of the present disclosure, the words "alternatively" or "in an implementation" are used to indicate examples, illustrations or descriptions. Any embodiment or design solution described as "alternatively" or "in an implementation" in the embodiments of the present disclosure should not be construed as superior or more advantageous than other embodiments or design solutions. To be precise, the use of the words "alternatively" or "in an implementation" is intended to present the relevant concepts in a specific manner.

Figure 1:
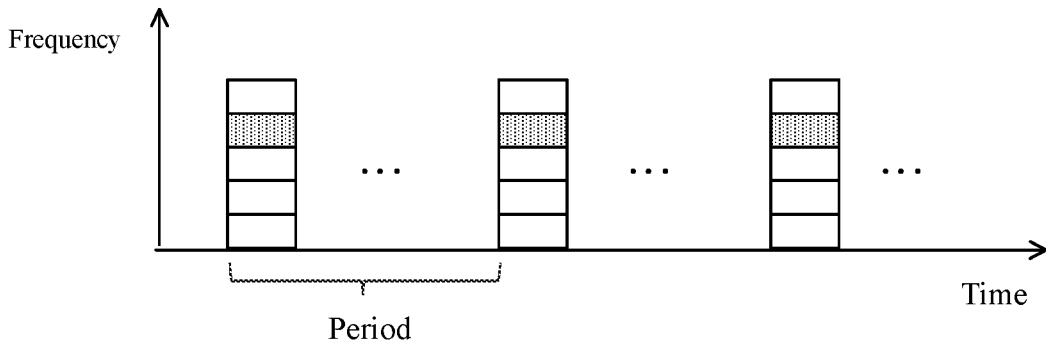
FIG. 1 is a schematic diagram of pre-configured resources in the existing technologies.
Figure 2:
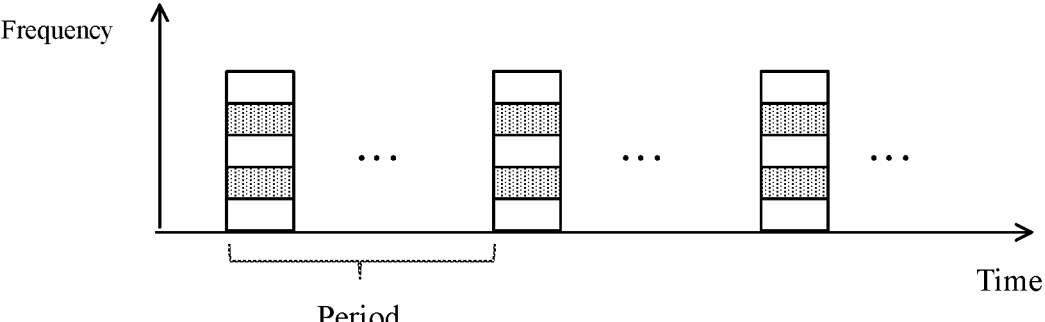
FIG. 2 is a schematic diagram of pre-configuring a plurality of frequency domain resources in the existing technologies.
Figure 3:
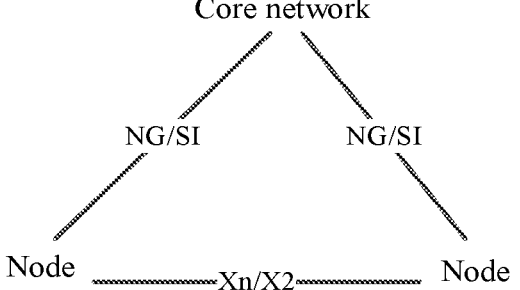
FIG. 3 is a schematic diagram of a network side architecture.

To facilitate understanding of the embodiments of the present disclosure, illustrations of some of the concepts related to the present disclosure are given for reference by way of example, as follows:

Unlicensed spectrum: when used in the networking of cellular networks, the unlicensed spectrum may be used for networking either as secondary spectrum for licensed spectra so as to be used as secondary node (SN) spectrum resources for dual-connectivity, or as secondary cell spectrum resources for carrier aggregation, or may be independently used for networking so as to be used as standalone cell spectrum resources. FIG. 3 illustrates the network side architecture during 4G/5G networking using unlicensed spectra, where nodes (e.g., base stations) provide radio services using unlicensed spectra, and connect to core network equipment via NG/SI interfaces, and nodes are connected to each other via an Xn/X2 interface.

Listen Before Talk (LBT) mechanism: the 3rd Generation Partnership Project (3GPP) and the European Telecommunications Standards Institute (ETSI) standards organizations have developed an LBT mechanism. Before sending data, a sender needs to listen for a channel to see whether it is idle, and if it is idle, the sender uses the channel to send the data, otherwise it needs to continue listening until the channel is idle. For example, in the case of two nodes sharing 100 MHz of bandwidth, if the nodes need to send data, they need to compete within the bandwidth they are prepared to occupy. If both nodes are prepared to send data within the same bandwidth at the same time, then these two nodes need to compete and only the successful node can send data.

Competition mechanism: ETSI and 3GPP have defined various competition mechanisms, among which CAT4/Type1 is a competition mechanism whereby the terminal device decides the duration for listening to the channel by generating a random number; CAT 2 25 us/Type2A is a competition mechanism in which a terminal device listens for a channel within a 25 us duration, where, generally after a base station has successfully preempted the channel, the channel is shared with the terminal device for it to send uplink data, while ensuring that the gap between uplink and downlink is 25 us; CAT 2 16 us/Type2B is a competition mechanism in which a terminal device listens for a channel within a 16 us duration, where generally, after a base station has successfully preempted the channel, the channel is shared with the terminal device for it to send uplink data, while ensuring that the gap between uplink and downlink is 16 us; and CAT 1/Type2C is a mechanism that allows a terminal device to send data immediately without listening for a channel, where generally, after a base station has successfully preempted the channel, the channel is shared with the terminal device for it to send uplink data, while ensuring that the gap between uplink and downlink is less than or equal to 16 us. These competition mechanisms require different durations to listen for the channel, and are ranked in descending order of durations or in descending order of difficulty in acquiring the channel access grant as follows: CAT4>CAT 2 25 us>CAT 2 16 us>CAT1.

The embodiments of the present disclosure may be applied in the scenario where in a section of frequency domain, the second communication node may configure and activate a plurality of configured grants, CG#1, CG#2, and CG#3, in multiple sub-bands (with 20 M of LBT bandwidth). At moment n, the first communication node fails in the competition in a sub-band where CG#2 is located, but succeeds in sub-bands where CG#1 and CG#3 are located, that is, the first communication node has the resources CG#1 and CG#3 available at moment n, which leads to the problem of wasted resource occupation.

Figure 4:
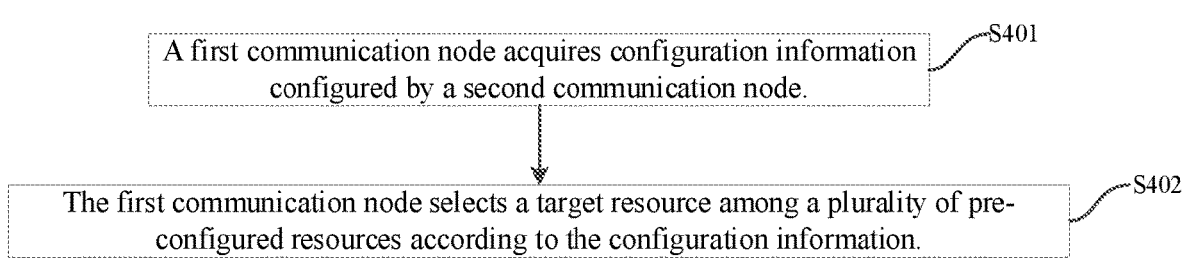
FIG. 4 is a flowchart of a resource determination method provided by an embodiment.

Based on the above concepts and the problem in the above scenario, FIG. 4 shows a flowchart of a resource determination method provided by an embodiment of the present disclosure. As shown in FIG. 4, the method may include the following steps.

At S401, a first communication node acquires configuration information configured by a second communication node.

In an implementation, the configuration information in the embodiment of the present disclosure may include initial transmission configuration information and/or retransmission configuration information. The second communication node and the first communication node may be two different types of communication nodes. For example, the first communication node may be a terminal device and the second communication node may be a base station.

At S402, the first communication node selects a target resource among a plurality of pre-configured resources according to the configuration information.

In this step, the pre-configured resources are time and frequency domain resources configured by the second communication node. For example, the second communication node may configure a plurality of configured grants or Semi-Persistent Scheduling (SPS) for the first communication node.

After the first communication node acquires the configuration information configured by the second communication node, it may select, based on the configuration information, a target resource among the plurality of pre-configured time-frequency resources configured by the second communication node. In this way, when the first communication node has a plurality of available spectrum resources, it may select a corresponding target time and frequency domain resource based on the configuration information, thus ensuring the reliability of the data transmission on the first communication node.

In the embodiment of the present disclosure, the initial transmission configuration information configured by the second communication node may include any one of a variety of information as follows.

The first kind of information indicates whether to enable the first communication node to select the target resource.

In an implementation, the second communication node may indicate, via a Radio Resource Control (RRC) message, a Media Access Control Control Element (MAC CE), or a Downlink Control Information (DCI) indication, whether to enable the first communication node to select the target resource. For example, the RRC message (e.g., an RRC reconfiguration message) may carry an information element that indicates whether to enable the function of the first communication node for selecting a resource; or the MAC CE or DCI indication carries a bit that indicates whether to enable the function of the first communication node for selecting the resource, e.g., 1 for enabling and 0 for not enabling.

The second kind of information enables the first communication node to select the target resource, and to select a frequency domain resource with minimum interference.

If the first communication node is configured with a plurality of available time and frequency domain resources by the second communication node, the first communication node can only select one of these resources to send data. Then, the second communication node may configure the first communication node to perform measurements on the plurality of resources, and the first communication node may obtain the interference measurement results (e.g., interference strength, interference frequency, or preemption success probability, etc.) for each frequency domain, and the first communication node selects a resource with minimum interference (e.g., a small interference strength value, a small interference frequency value, or a large preemption success probability value, etc.) based on the measurement value on each frequency domain, thereby guaranteeing the latency and reliability of service transmission.

Further, a specific example provided by embodiments of the present disclosure may be a scenario where the first communication node performs a separate measurement on each sub-band and obtains the interference strength (received signal strength) and the channel occupancy rate (the percentage of the received signal strength above a certain threshold value, which reflects the interference frequency) for each sub-band. If the interference strength of a sub-band is less than a corresponding threshold value and/or the channel occupancy rate is below a corresponding threshold value, the first communication node determines that the interference on that sub-band is small and then selects a resource on that sub-band; or if the interference strength of a sub-band is less than a corresponding threshold value and/or the channel occupancy rate is below a corresponding threshold value, and the interference strength value is minimum or the channel occupancy rate value is minimum, the first communication node determines that the interference on that sub-band is small and then selects a resource on that sub-band.

The third information indicates selection of the target resource based on a competition mechanism.

Figure 5:
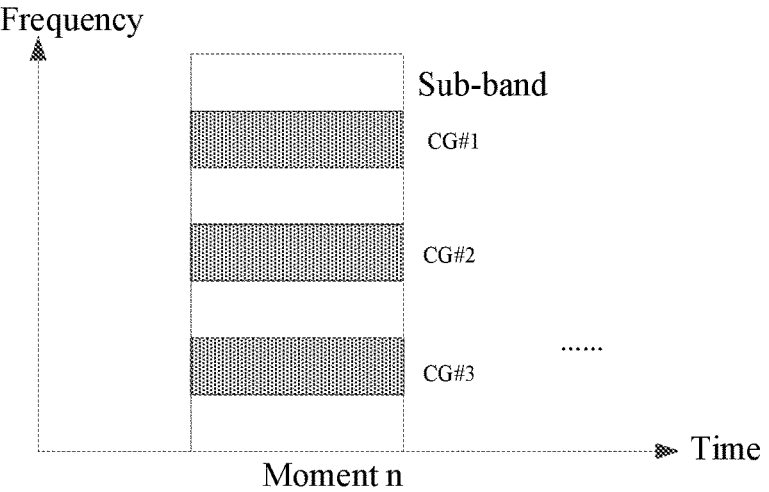
FIG. 5 is a schematic diagram of a node configuring resources in a plurality of sub-bands in the existing technologies.

The second communication node pre-configures a plurality of frequency domain resources, e.g., a plurality of configured grants or SPS configurations. At a certain moment, when the first communication node needs to send data, there exist a plurality of frequency domain resources configured by the second communication node, and each resource corresponds to a different competition type, for example, the second communication node configures and activates a plurality of configured grants, CG#1, CG#2, and CG#3, on multiple sub-bands (with 20M of LBT bandwidth). As shown in FIG. 5, at moment n, the first communication node performs Cat1 type competition in a sub-band where CG#1 is located, Cat4 type competition in a sub-band where CG#2 is located, Cat2 25 us type competition in a sub-band where CG#3 is located, and Cat2 16 us type competition is required in a sub-band where CG#4 is located. Since the ranking of the success probabilities of the first communication node to acquire the channel access grant in the various competition mechanisms is Cat1≥Cat2 16 us≥Cat2 25 us≥Cat4, the first communication node may select a resource of a configured grant, i.e., CG#1, with a high probability to acquire the channel access grant.

In this way, in the case where the first communication node has a plurality of configured uplink resources at the same time and each resource corresponds to a different competition mechanism required to be performed for acquiring the frequency domain resources, the selection of resources by the first communication node according to the competition mechanism can ensure as much as possible that the first communication node acquires the channel access grant and obtains the available target resource, thus ensuring the latency for service data.

The fourth kind of information instructs the first communication node to select the target resource based on parameter information, where the parameter information includes any one of a first communication node identifier, a cell identifier, a random number, or frequency band information.

In an implementation, suppose that the initial transmission configuration information is information enabling the first communication node to select the target resource based on parameter information, then in the case where the first communication node is configured with a plurality of pre-configured resources, the first communication node may select a frequency domain resource according to the first communication node identifier in such a way that there is an association relationship between the first communication node identifier (which may be a node identifier or another identifier assigned by the second communication node, such as s-tmsi) and each configured resource, where the association relationship may be to associate values calculated based on the first communication node identifier to the configuration resources. For example, three first communication nodes share CG#1, CG#2, and CG#3, where the identifier of the first communication node 1 is 1, the identifier of the first communication node 2 is 2, and the identifier of the first communication node 3 is 3. Then, if the first communication node identifier mod 3=0, that first communication node selects CG#1; if the first communication node identifier mod 3=1, that first communication node selects CG#2; and if the first communication node identifier mod 3=2, that first communication node selects CG#3.

The first communication node may select the target resource based on a cell identifier in such a way that there is an association relationship between the cell identifier (e.g., a physical cell identifier or a global uniform identifier or other cell-level identifier of the cell) and each configured resource, where the association relationship may be to associate values calculated based on the cell identifier to the configured resources. For example, three first communication nodes share CG#1, CG#2, and CG#3, where the identifier of cell 1 where the first communication node 1 is located is 1, the identifier of cell 2 where the first communication node 2 is located is 2, and the identifier of cell 3 where the first communication node 3 is located is 3. Then, if the cell identifier mod 3=0, the first communication node of that cell selects CG#1; if the cell identifier mod 3=1, the first communication node of that cell selects CG#2; and if the cell identifier mod 3=2, the first communication node of that cell selects CG#3.

The first communication node may select the target resource based on a random number in such a way that the first communication node generates a random number and different random numbers are associated to different configured resources. For example, three first communication nodes share CG#1, CG#2, and CG#3, and each of the first communication nodes generates a random integer between 1 and 3, and if the random integer generated by the first communication node is 1, CG#1 is selected; if the random integer generated by the first communication node is 2, CG#2 is selected; and if the random integer generated by the first communication node is 3, CG#3 is selected.

The first communication node may select the target resource based on frequency band information in such a way that the second communication node notifies, via system information or an RRC message, the first communication node of frequency band information for frequency bands, such as a competition type, a competition priority, service information, a resource type, a circumvention type, a reserved resource, etc., for each frequency band. According to the above frequency band information, the first communication node preferentially selects a frequency domain resource corresponding to a frequency band for which the competition mechanism has short usage time or high priority, or sub-preferentially selects a resource corresponding to a frequency band for which the competition mechanism has long usage time or low priority, or evades, silences or abandons a resource corresponding to a frequency band that needs to be evaded. For example, the second communication node carries an information element in an RRC message (e.g., an RRC reconfiguration message) and the information element indicates that a certain frequency band has a low competition priority and another frequency band has a high competition priority, then the first communication node may preferentially select a resource on the frequency band with the high competition priority.

The above-mentioned different approaches allow the first communication nodes to select corresponding target resources, reducing the competition between the first communication nodes, thus ensuring the latency and the reliability of data transmission on the first communication nodes.

In an implementation, the retransmission configuration information configured by the second communication node may include any one of a variety of information as follows.

The first kind of information enables the first communication node to select the target resource, and to select a target resource with minimum interference based on a retransmitted data packet transport block size (TBS).

If the first communication node supports automatic retransmission, then in a scenario where there are a plurality of available frequency domain resources for the first communication node, the first communication node selects a target resource with minimum interference based on the retransmitted data packet TBS. For example, the first communication node selects a frequency domain resource that is larger than and closest to the retransmitted data packet TBS, and later selects a frequency domain resource with minimum interference, so as to improve resource utilization.

The second kind of information enables selection of the target resource for retransmission according to a timer and a retransmitted data packet TBS.

In an implementation, suppose that the second communication node configures a plurality of pre-configured resources for the first communication node, and each pre-configured resource may have a different moment (period, starting moment, etc.), frequency domain position, transport block size, etc. At a certain moment, when the first communication node transmits a data packet on one of the pre-configured resources at that moment or generates a data packet based on the TBS of the pre-configured resource at that moment, and the first communication node starts the timer at the same time, if the transmission of the data packet fails, the data packet needs to be retransmitted, then, before the timer times out, the first communication node may select a pre-configured resource having the same TBS as the data packet, so as to perform data retransmission; and after the timer times out, the first communication node may select a pre-configured resource having a TBS greater than or equal to the retransmitted data packet and having a closest time, so as to perform data retransmission.

Figure 6:
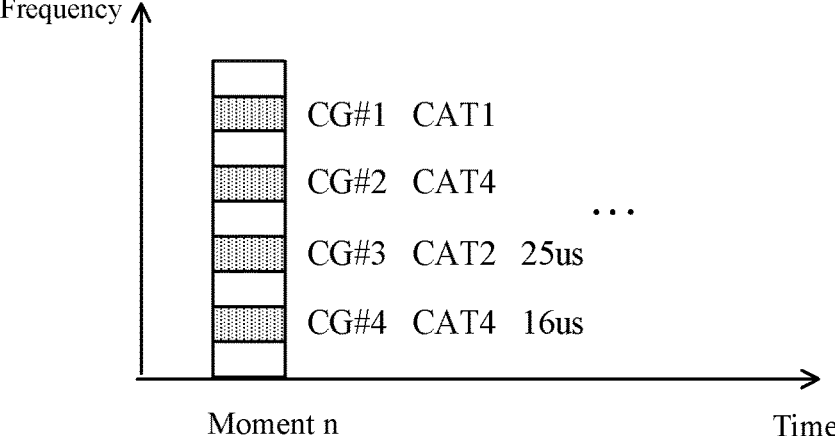
FIG. 6 is a schematic diagram of competition mechanisms.

For example, as shown in FIG. 6, the first communication node has a plurality of pre-configured resources, CG#1, CG#2, and CG#3, and CG#1 TBS>CG#2 TBS=CG#3 TBS. Suppose that the first communication node selects CG#2 at moment a and generates data packet 1 based on the TBS of CG#2, and at the same time, the first communication node starts the timer at moment a, but at moment a, the first communication node fails in the competition and needs to retransmit data packet 1, then, if the first communication node has not found a pre-configured resource (e.g., CG#1, CG#3) having the same TBS as the retransmitted data packet until the timer times out, but after the timer times out, at moment b, the resource of CG#1 is the most adjacent and CG#1 TBS>CG#2 TBS, the first communication node selects the resource of CG1 at moment b to retransmit data packet 1.

Similarly, suppose that the first communication node selects CG#2 at moment d and generates data packet 2 based on the TBS of CG#2, while the first communication node starts a timer at moment d, but at moment d, the first communication node fails in the competition and needs to retransmit data packet 2, then, if the first communication node has found a pre-configured resource (e.g., CG#3) having the same TBS as the retransmitted data packet before the timer times out, the first communication node selects a resource of CG3 at moment d to retransmit the data packet.

It should be noted that the duration of the timer in the above process may be configured by the second communication node for the pre-configured resources.

The third kind of information enables selection of the target resource for retransmission according to a pre-configured resource attribute, where the pre-configured resource attribute is a preemption priority or whether to allow occupancy.

The second communication node configures different attributes for different pre-configured resources, for example, configures different preemption priorities. The second communication node may configure an information element for each pre-configured resource via RRC signaling or DCI, where the information element may have several bits, and the bit values indicate the preemption priorities of the pre-configured resources, for example, 11 indicates a preemption priority of 3, 10 indicates a preemption priority of 2, and the like. Then, when the first communication node transmits a data packet on a pre-configured resource with a high preemption priority, if retransmission occurs, the first communication node may occupy a resource with an equal preemption priority or a lower pre-configured resource priority for retransmission. In contrast, when the first communication node transmits a data packet on a pre-configured resource with a low preemption priority, if a retransmission occurs, the first communication node cannot occupy a pre-configured resource with a high preemption priority for retransmission.

In an implementation, suppose that the first communication node has a plurality of pre-configured resources, CG#1, CG#2, and CG#3, and the second communication node configures CG#1 with a preemption priority of 11, CG#2 with a preemption priority of 10, and CG#3 with a preemption priority of 10. When the first communication node transmits a data packet on CG#1, the data packet needs to be retransmitted due to unsuccessful channel preemption on CG#1, then the first communication node may choose to retransmit the data packet on a resource on CG#1, CG#2, and CG#3. If the first communication node transmits a data packet on CG#2, the data packet needs to be retransmitted due to unsuccessful channel preemption on CG#2, then the first communication node may choose to retransmit the data packet on a resource on CG#2 and CG#3.

If the second communication node configures the attribute for the pre-configured resource as whether to allow occupancy, for example, the second communication node configures an information element for each pre-configured resource via RRC signaling or DCI, where the information element may have 1 bit, and 1 may indicate that occupancy is allowed and 0 may indicate that occupancy is not allowed. If a pre-configured resource is configured as being not allowed to be occupied, that pre-configured resource may not be used to retransmit a data packet that was not successfully transmitted on other pre-configured resources. If a pre-configured resource is configured as being allowed to be occupied, that pre-configured resource may be used to transmit a data packet that was not successfully transmitted on other pre-configured resources.

In an implementation, suppose that the first communication node has a plurality of pre-configured resources, CG#1, CG#2, and CG#3, and the second communication node configures CG#1 to be not allowed to be occupied, CG#2 to be allowed to be occupied, and CG#3 to be allowed to be occupied, then when the first communication node transmits a data packet on CG#1, the data packet needs to be retransmitted due to unsuccessful channel preemption on CG#1, then the first communication node may choose to retransmit the data packet on a resource on CG#1, CG#2 and CG#3. If the first communication node transmits a data packet on CG#2, the data packet needs to be retransmitted due to unsuccessful channel preemption on CG#2, then the first communication node may choose to retransmit the data packet on a resource on CG#2 and CG#3.

FIG. 7 is a flowchart of a resource determination method provided by an embodiment of the present disclosure. As shown in FIG. 7, the method includes the following steps.

At S701, a first communication node listens, under a first condition, for signaling sent by a second communication node.

The first communication node in the above step may be at least two communication nodes, and the first communication node may be a terminal device and the second communication node may be a base station, that is, the first communication node and the second communication node are two different types of communication nodes. Then this step may be that a plurality of terminal devices listen, under the first condition, for signaling sent by the base station.

In an implementation, pre-configured resources for the plurality of first communication nodes in this step may be in the same frequency domain, and in the same or different time domain. As shown in FIG. 8, the first communication node 1 and the first communication node 2 are both in sub-band 1.

At S702, the first communication node de-activates and/or activates a specified resource according to the signaling.

After hearing the signaling from the second communication node under the first condition, the plurality of first communication nodes may de-activate and/or activate a specified resource based on the signaling.

For example, suppose that the first communication nodes 1 and 2 are both in sub-band 1 and a Wi-Fi node occupies the frequency domain of sub-band 1 to send data for a period of time, all communication nodes (including the first communication nodes 1 and 2) on sub-band 1 may be subject to continuous interference. Therefore, a configured grant or SPS for a certain sub-band may be de-activated by a de-activation signaling, or a configured grant or SPS for a certain sub-band may be activated by an activation signaling.

In this way, while conserving radio resources, it is possible to select a plurality of first communication nodes to other frequency domains (e.g., frequency domains with smaller interference) through a single piece of signaling to reduce signaling overhead and decrease signaling latency, thereby ensuring the reliability and latency requirements of data services transmitted on the plurality of first communication nodes.

In an implementation, in the embodiment of the present disclosure, the signaling sent by the second communication node may be a common physical downlink control channel (PDCCH), where different information may be carried in the common PDCCH, as follows:

As to the first kind of information, the common PDCCH carries configuration information for activation and/or configuration information for de-activation.

The plurality of first communication nodes listen for the common PDCCH, and this common PDCCH may notify the plurality of first communication nodes that they are required to de-activate a resource on a certain frequency domain and activate a resource on other frequency domains, where the resources on that frequency domain may be resources of the entire frequency domain or may be pre-configured resources.

For example, the common PDCCH may carry a pre-configured index indicating activation, and/or a pre-configured index indicating de-activation, whereby the common PDCCH instructs the plurality of first communication nodes to de-activate a pre-configured resource on a certain frequency domain and activate a pre-configured resource on other frequency domains. After successfully hearing the common PDCCH, the plurality of first communication nodes may activate a corresponding pre-configured resource according to the instruction. In an implementation, suppose that the plurality of first communication nodes have successfully heard a Group Common-PDCCH (GC-PDCCH), the GC-PDCCH may carry a configured grant or SPS index for activation, configured scheduling information (e.g., the frequency domain position, the time position, the Modulation and Coding Scheme (MCS), etc.) for the configured grant or SPS for activation, and/or the configured de-activation information such as a configured grant or SPS index for de-activation. After successfully hearing and decoding this GC-PDCCH, the plurality of first communication nodes may activate and de-activate the corresponding configured grants or SPS according to the instruction.

Alternatively, the common PDCCH may carry frequency domain information indicating activation, and/or frequency domain information indicating de-activation, whereby the common PDCCH instructs the plurality of first communication nodes to de-activate the entire resource on a certain frequency domain and activate the entire resources on other frequency domains. After successfully hearing the common PDCCH, the plurality of first communication nodes may activate the corresponding frequency domain resources according to the instruction. In an implementation, suppose that the plurality of first communication nodes have successfully heard the GC-PDCCH, the GC-PDCCH may carry information indicating activation such as a frequency domain index (e.g., a Bandwidth Part (BWP) index) for activation, and/or a configured de-activation information such as a frequency domain index (e.g., a BWP index) for de-activation. After successfully hearing and decoding the GC-PDCCH, the plurality of first communication nodes may activate and de-activate the corresponding frequency domain (e.g., BWP) and the configured grants or SPS on this frequency domain according to the instruction.

As to the second kind of information, the common PDCCH carries a user identifier, a pre-configured index for activation and/or a pre-configured index for de-activation.

The plurality of first communication nodes listen for the common PDCCH, and where the plurality of first communication nodes have different configurations, the common PDCCH may execute a corresponding instruction for each of the first communication nodes to notify that first communication node that it is required to de-activate a resource on a frequency domain and to activate a resource on other frequency domains. where the resources on that frequency domain may be resources of the entire frequency domain or may be pre-configured resources.

For example, the common PDCCH may notify different first communication nodes that they are required to de-activate and/or activate pre-configured resources on different frequency domains. For example, the common PDCCH indicates, for each first communication node, a pre-configured index for activation and/or a pre-configuration index for de-activation. After successfully hearing the common PDCCH, the first communication nodes may de-activate and/or activate the corresponding pre-configured resource according to the instruction. In an implementation, suppose that the plurality of first communication nodes listen for the GC-PDCCH, the GC-PDCCH carries first communication node identifiers, a configured grant or SPS index for activation, configured scheduling information (e.g., the frequency domain position, the time position, the MCS, etc.) for the configured grant or SPS for activation, and/or de-activation information and the first communication node identifiers and a configured grant or SPS index for de-activation. After successfully hearing and decoding the GC-PDCCH, the first communication nodes may activate and de-activate the corresponding configured grant or SPS according to the instruction.

Alternatively, the common PDCCH notifies different first communication nodes that they are required to activate the entire resource on different frequency domains and activate the entire resource on different other frequency domains. For example, the common PDCCH may indicate frequency domain information for activation for each first communication node, and/or frequency domain information for de-activation for each first communication node. After successfully hearing the common PDCCH, the first communication nodes may activate the corresponding frequency domain resource according to the instruction. In an implementation, suppose that the plurality of first communication nodes listen for the GC-PDCCH, the GC-PDCCH carries first communication node identifiers, activation information corresponding to the first communication node identifiers, and a frequency domain index (e.g., a BWP index) for activation, and/or the first communication node identifiers and de-activation information corresponding to the first communication node identifiers as well as a frequency domain index (e.g., a BWP index) for de-activation. After successfully hearing and decoding the GC-PDCCH, the first communication nodes may activate and de-activate the corresponding frequency domain (e.g., BWP) and the configured grant or SPS on this frequency domain according to the instruction.

It should be noted that the above-mentioned common PDCCH listened for by the plurality of first communication nodes may be scrambled by Configured Scheduling-Radio Network Temporary Identity (CS-RNTI), System Information RNTI (SI-RNTI), Paging RNTI (P-RNTI), Interruption RNTI (INT-RNTI), Slot Format Indication RNTI (SFI-RNTI), Transmit Power Control-Physical Uplink Shared Channel-RNTI (TPC-PUSCH-RNTI), TPC-Physical Uplink Control Channel-RNTI (TPC-PUCCH-RNTI), or TPC-Sounding Reference Symbols-RNTI (TPC-SRS-RNTI), other RNTIs or scrambled by new RNTIs (such as NR-RNTI).

Further, in step S701 of this embodiment, the plurality of first communication nodes need to listen for the signaling sent by the second communication node under the first condition. This first condition may include any one of the following: a first service is transmitted on the first communication nodes, or the first communication nodes transmit data on a first spectrum, or the first communication nodes receive an indication message sent by the second communication node, where the indication message is used to instruct the first communication nodes to listen for the signaling sent by the second communication node.

For example, the first service may be a service with strict latency requirements, such as URLLC. When such a service with strict latency requirements is transmitted on the first communication nodes, the first communication nodes may consider that the above-mentioned common PDCCH has the function of indicating activation and/or de-activation of a specified frequency domain resource, and thus listen for the common PDCCH.

The first spectrum may be a characteristic spectrum such as an unlicensed spectrum, and when the first communication nodes transmit data on such a characteristic spectrum, the first communication nodes confirm that the above-mentioned common PDCCH has the function of indicating activation and/or de-activation of a specified frequency domain resource, and thus listen for the common PDCCH.

Alternatively, when the second communication node indicates to the first communication nodes via system information or an RRC message that the above-mentioned common PDCCH has the function of indicating activation and/or de-activation of a specified frequency domain resource, the first communication nodes confirm that the above-mentioned common PDCCH has the above-mentioned function and listen for the common PDCCH. For example, the system information or the RRC message (e.g., an RRC reconfiguration message) carries an information element that instructs a certain common PDCCH to enable activation or de-activation of a pre-configured function.

FIG. 9 is a flowchart of a resource determination method provided by an embodiment of the present disclosure. As shown in FIG. 9, the method includes the following steps.

At S901, a first communication node acquires indication information configured by a second communication node.

In the embodiment of the present disclosure, the first communication node may be at least two (or more) communication nodes, and the first communication node may be a terminal device and the second communication node may be a base station, that is, the first communication node and the second communication node are two different types of communication nodes.

In an implementation, the indication information in this embodiment includes: a competition priority, or whether to reduce the competition level, or whether to delay competition, or whether to cancel sending or to be silent, or whether to generate a random number.

At S902, the first communication node competes for a pre-configured resource according to the indication information.

Figure 10:
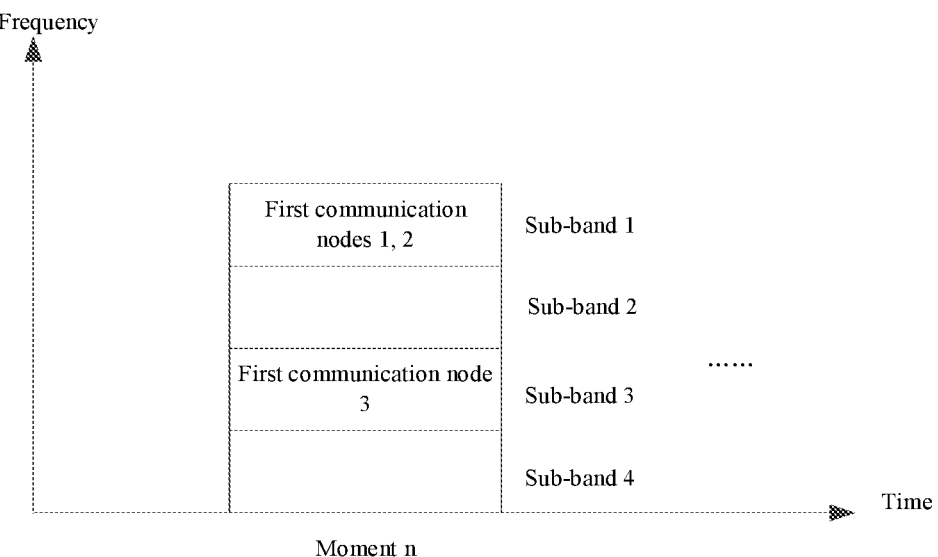
FIG. 10 is a schematic diagram of a case where a plurality of first communication nodes are configured on the same frequency domain and time domain.

The pre-configured resources in this step may be frequency domain resources configured by the second communication node for the plurality of first communication nodes. For example, the pre-configured resources for the plurality of first communication nodes may be in the same frequency domain and at the same moment, that is, in a certain frequency domain, there may be resources for the plurality of first communication nodes. As shown in FIG. 10, both the first communication node 1 and the first communication node 2 overlap in sub-band 2 at moment n.

In the case where a plurality of first communication nodes share the same frequency domain resources, the plurality of first communication nodes may compete for the pre-configured resource based on the acquired indication information.

In an implementation, suppose that the indication information in step S902 is the competition priority, then the plurality of first communication nodes may compete for a channel based on that competition priority. For example, when the pre-configurations of two first communication nodes conflict, the second communication node may pre-configure a competition priority for each of the first communication nodes. For example, when there is a service (e.g., URLLC) with strict latency requirements and high reliability on one of the first communication nodes, the second communication node may configure a high competition priority for that first communication node; and when there is no service with strict latency requirements and high reliability on one of the first communication nodes, the second communication node configures a low competition priority for that first communication node.

For a first communication node configured with a low competition priority, the competition is delayed during the competition for the channel, in which case the delay time may be generated randomly or specified by the second communication node; or the time of competition is limited during the competition for the channel, that is, the first communication node with a low competition priority can only compete for the channel for a certain period of competition time and has to give up competition in the case of unsuccessful competition, where the time of competition may be specified by the second communication node. The second communication node configures or indicates the competition priority either by RRC signaling, DCI indication, or MAC CE. For example, an RRC message (e.g., an RRC reconfiguration message) carries an information element that indicates a pre-configured competition priority as a high or low priority; or a MAC CE or DCI indication carries a bit that indicates a pre-configured competition priority, such as 1 for a low priority and 0 for a high priority.

If the indication information is whether to reduce the competition level, the plurality of first communication nodes may compete for the channel based on whether to reduce the competition level. For example, the first communication nodes may use a competition mechanism with a lower competition level or a longer competition time. In an implementation, this competition mechanism may be CAT2 25 us, CAT2 16 us, CAT4, or CAT1, and the ranking result in the order of competition duration from longest to shortest is CAT4>CAT 2 25 us>CAT 2 16 us>CAT1. Suppose that the second communication node configures the indication information by means of RRC signaling, DCI indication or MAC CE, for example, an RRC message (e.g., an RRC reconfiguration message) carries an information element that enables reduction of the competition level of a certain pre-configuration and adoption of a competition mechanism with a longer competition duration. Alternatively, the MAC CE or DCI indication carries a bit that indicates reduction of the competition level of a certain pre-configuration, 1 being reduction of the competition level and adoption of a competition mechanism with a longer competition duration. After receiving the indication information, the first communication node may reduce the competition level for a certain pre-configured resource and adopt a competition mechanism with a longer competition duration to acquire the channel access grant.

The above process is described in further detail with a specific example below. Suppose that both the first communication node 1 and the second communication node 2 may compete for the channel using the CAT2 25 us competition mechanism. However, if there is a service (e.g., URLLC) with strict latency requirements and high reliability on the first communication node 1 and there is no service with strict latency requirements and high reliability on the first communication node 2, the first communication node 1 uses a CAT2 25 us competition mechanism and the first communication node 2 uses a competition mechanism with a longer competition duration than CAT2 25 us, e.g., CAT4.

If the indication information is whether to delay competition, the plurality of first communication nodes may compete for the channel based on whether to delay competition. For example, when the pre-configurations of two first communication nodes have a conflict in the respect of reduction of the competition level, the second communication node may instruct one of the first communication nodes to delay competition by means of indication information, where the indication may be through RRC message configuration or DCI indication or MAC CE. For example, an RRC message (e.g., an RRC reconfiguration message) carries an information element that enables a certain pre-configuration to delay competition, and a MAC CE or DCI indication carries a bit that indicates whether a certain pre-configuration is to delay competition, with 1 indicating that delay of competition is required. Further, this indication information may carry information about the delay of competition, e.g., the delay time. After acquiring the indication information, according to the indication information, the first communication node delays for a certain period of time before competing for the channel. The delay time may be generated randomly, or specified by the second communication node.

In an implementation, suppose that there is no service (e.g., URLLC) with strict latency requirements and high reliability on the first communication node 2 and that the first communication node 2 acquires the delay of competition indicated by the second communication node via the indication information, then the first communication node 2 delays competition for a period of time after moment n, or delays competition for a further period of time after a moment that would otherwise require competition, where the delayed period of time is determined based on the delay time.

If the indication information is whether to cancel sending or to be silent, the plurality of first communication nodes may compete for the channel by means of this indication information. For example, when the pre-configurations of the plurality of first communication nodes conflict, the second communication node may instruct, by means of an indication message, one of the first communication nodes to cancel sending or to be silent in a certain frequency domain or at a certain moment, where the indication may be through RRC message configuration or DCI indication or MAC CE. Further, the indication information may carry a starting moment of the cancellation of information sending, the duration (e.g., in time slots, subframes, symbols) of the cancellation of sending. In an implementation, an RRC message (e.g., an RRC reconfiguration message) carries an information element that enables cancellation of data sending or silence on a certain pre-configuration, or it may carry the time of cancellation of sending; and the MAC CE or DCI indication carries a bit that indicates whether to cancel data sending on a pre-configuration or to be silent, with 1 indicating cancellation of sending or being silent, and further, it may also carry a starting moment of cancellation of sending, and the duration of cancellation of sending. After acquiring the indication information, according to the indication, the first communication node may immediately cancel sending, or cancel sending at a certain moment (determined by the starting moment of the cancellation of sending) after a certain period of time, or cancel the sending for a period of time (determined by the starting moment and the duration of the cancellation of sending) after a certain period of time.

Moreover, this method is also applicable to the case where the competition priorities of a plurality of users are notified through a piece of information or instruction (e.g., RRC signaling, DCI indication, or MAC CE). For example, a pre-configured cancellation of sending or silence for the plurality of users is indicated by a common PDCCH (GC-PDCCH), where the common PDCCH may carry a configured grant index and, correspondingly, whether to adopt cancellation of sending or silence.

If the indication information is whether to generate a random number, the plurality of first communication nodes may compete for the channel based on the random number. For example, in the case where a first communication node has a pre-configured resource on a frequency domain at a certain moment and the indication information indicates that the first communication node may generate a random number, the first communication node decides whether to compete for the channel on which the pre-configured resource is located based on the size of the generated random number. For example, suppose that the first communication node generates a random number of 0 or 1. When the random number is 1, it indicates that the first communication node competes for the channel where that pre-configured resource is located, otherwise not. The indication information may be indicated through RRC signaling, DCI indication, or MAC CE. For example, an RRC message (e.g., an RRC reconfiguration message) carries an information element that enables a first communication node on a certain pre-configuration to use a random number to decide whether to compete, and further, in the case of using a random number to decide whether to compete, it may also carry the size of the random number; and the MAC CE or DCI indication carries a bit that indicates whether a first communication node on a certain pre-configuration uses a random number to decide whether to compete, for example, 1 for using a random number to decide whether to compete, and further, in the case of using a random number to decide whether to compete, several bits may also be carried to indicate the size of the random number.

It should be noted that the above indication information may be notified to the plurality of first communication nodes via a piece of information or instruction (e.g., RRC signaling, DCI indication, or MAC CE). For example, the pre-configured competition priorities of the plurality of first communication nodes are indicated by a common PDCCH (GC-PDCCH), in which case the common PDCCH may carry the configured grant indexes, and the corresponding competition priorities, or whether to reduce the competition level, or whether to delay competition, or whether to cancel sending or to be silent.

In this way, the latency requirements of the services on the first communication nodes can be effectively ensured while improving the resource utilization and avoiding the situation of competition among the first communication nodes.

Figure 11:
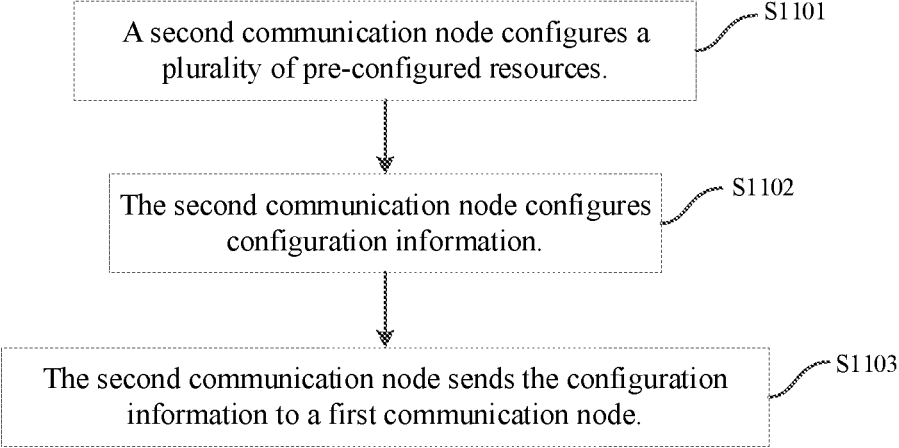
FIG. 11 is a flowchart of a resource determination method provided by an embodiment.

FIG. 11 is a flowchart of a resource determination method provided by an embodiment of the present disclosure. As shown in FIG. 11, the method includes the following steps.

At S1101, a second communication node configures a plurality of pre-configured resources.

In this step, the pre-configured resources may be time and frequency domain resources configured by the second communication node for a first communication node. For example, the second communication node may configure a plurality of configured grants or Semi-Persistent Scheduling (SPS) for the first communication node, where the second communication node and the first communication node may be two different types of communication nodes. For example, the first communication node is a terminal device and the second communication node is a base station.

At S1102, the second communication node configures configuration information.

The above configuration information configured by the second communication node may include initial transmission configuration information and/or retransmission configuration information, where the configuration information is used to instruct the first communication node to select, based on the configuration information, a target resource among the plurality of pre-configured resources configured by the second communication node.

At S1103, the second communication node sends the configuration information to a first communication node.

In an implementation, the second communication node may send the configuration information to the first communication node via an RRC message, a MAC CE, or DCI.

Here, the configured initial transmission configuration information includes any one of: information indicating whether to enable the first communication node to select the target resource; or information enabling the first communication node to select the target resource, and to select a frequency domain resource with minimum interference; or information indicating selection of the target resource based on a competition mechanism; or information instructing the first communication node to select the target resource based on parameter information, where the parameter information includes any one of a first communication node identifier, a cell identifier, a random number, or frequency band information.

For example, the second communication node may carry an information element in the RRC message (e.g., an RRC reconfiguration message), where the information element indicates whether to enable the function of the first communication node for selecting a resource; or the MAC CE or DCI indication carries a bit that indicates whether to enable the function of the first communication node for selecting the resource, e.g., 1 for enabling and 0 for not enabling.

The configured retransmission configuration information includes any one of: information enabling the first communication node to select the target resource, and to select a target resource with minimum interference based on a retransmitted data packet TBS; or information enabling selection of the target resource for retransmission according to a timer and a retransmitted data packet TBS; information enabling selection of the target resource for retransmission according to a pre-configured resource attribute, where the pre-configured resource attribute is a preemption priority or whether to allow occupancy.

In an implementation, the second communication node may configure a duration of the above timer for the pre-configured resources.

In an implementation, the second communication node may configure an information element for each pre-configured resource via RRC signaling or DCI, where the information element may have several bits, and the bit values indicate the preemption priority, for example, 11 indicates a preemption priority of 3, 10 indicates a preemption priority of 2, and the like, where when the transmission of a data packet transmitted on a pre-configured resource with a high preemption priority fails, a resource with the same preemption priority or a low priority of pre-configured resource may be occupied for retransmission. Alternatively, the second communication node configures an information element for each pre-configured resource via RRC signaling or DCI, where the information element may have 1 bit, for example, 1 indicates that occupancy is allowed and 0 indicates that occupancy is not allowed. If a pre-configured resource is configured as being not allowed to be occupied, that pre-configured resource may not be used to retransmit a data packet that was not successfully transmitted on other pre-configured resources. If a pre-configured resource is configured as being allowed to be occupied, that pre-configured resource may be used to transmit a data packet that was not successfully transmitted on other pre-configured resources.

Figure 12:
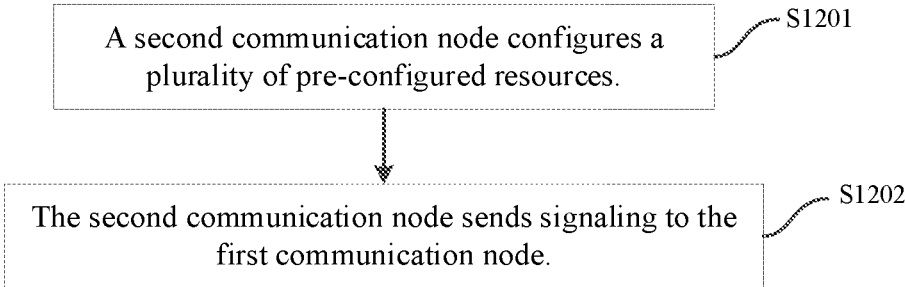
FIG. 12 is a flowchart of a resource determination method provided by an embodiment.

FIG. 12 is a flowchart of a resource determination method provided by an embodiment of the present disclosure. As shown in FIG. 12, the method includes the following steps.

At S1201, a second communication node configures a plurality of pre-configured resources.

In an implementation, when configuring the plurality of pre-configured resources, the second communication node may configure a plurality of first communication nodes on the same frequency domain, and on the same or different time domains.

At S1202, the second communication node sends signaling to the first communication node.

The above-mentioned signaling is used to instruct the first communication node configured on the pre-configured resource to de-activate and/or activate a specified resource.

In an implementation, the above signaling may be a common PDCCH, where the common PDCCH carries configuration information for activation, and/or configuration information for de-activation; or the common PDCCH carries a first communication node identifier, configuration information for activation, and/or configuration information for de-activation.

In an implementation, the second communication node may also instruct, via system information or an RRC message, the first communication node to listen for the above-mentioned common PDCCH. For example, the system information or RRC message (e.g., an RRC reconfiguration message) carries an information element that may indicate that a particular common PDCCH has a function of indicating activation and/or de-activation of a specified frequency domain resource.

FIG. 13 is a flowchart of a resource determination method provided by an embodiment of the present disclosure. As shown in FIG. 13, the method includes the following steps.

At S1301, a second communication node configures a plurality of pre-configured resources.

In this embodiment, when configuring the plurality of pre-configured resources, the second communication node may configure some first communication nodes on the same frequency domain and at the same moment. Here, the first communication node and the second communication node are different types of nodes. For example, the first communication node is a terminal device and the second communication node is a base station.

At S1302, the second communication node configures indication information.

The indication information in this step is configured to instruct, based on the indication information, the first communication node to compete for a frequency domain resource among the plurality of pre-configured resources configured by the second communication node.

At S1303, the second communication node sends the indication information to the first communication node.

In an implementation, the first communication node in this embodiment may be a plurality of first communication nodes, that is, the second communication node may send the indication information to the plurality of first communication nodes via a piece of information or instruction (e.g., RRC signaling, DCI indication, or MAC CE). For example, the pre-configured indication information for the plurality of first communication nodes is indicated via a common PDCCH (GC-PDCCH), in which case the common PDCCH may carry a configured grant index.

Alternatively, the indication information may include: a competition priority, or whether to reduce the competition level, or whether to delay competition, or whether to cancel sending or to be silent, or whether to generate a random number.

The second communication node sends the indication information to the first communication node, so that the plurality of first communication nodes can compete for a frequency domain resource among the plurality of pre-configured resources based on the indication information, thereby avoiding the problem of resource conflicts among the plurality of first communication nodes on the pre-configured resources.

FIG. 14 is a flowchart of a resource determination method provided by an embodiment of the present disclosure. As shown in FIG. 14, the method includes the following steps.

At S1401, a second communication node divides resources.

In the embodiment of the present disclosure, the second communication node may divide the resources in accordance with a time-domain and/or frequency-domain method. For example, the frequency band is divided into a plurality of parts; or the moments within a certain period of time are divided into a plurality of parts in a time division manner; or for a list of moments within a certain period of time, the bandwidth within each moment is divided; or the bandwidth is divided and the time for the bandwidth parts is indicated, and a corresponding time division is performed for each bandwidth part.

At S1402, the second communication node sends, via an interface message, a resource indication and a corresponding level to an adjacent node.

After dividing the resources in accordance with the corresponding division manner, the second communication node sends the resource indication after division and the level corresponding to each part of resources as divided to an adjacent node via an interface message, for example, through an Xn, X2 interface between the second communication node and the adjacent node, with the process being is shown in FIG. 15. The adjacent node is a node of the same type as the second communication node. For example, suppose that both the adjacent node and the second communication node are base stations.

Alternatively, the second communication node may also notify or configure the resource indication and the corresponding level to the first communication node in the form of system information or RRC message, and the first communication node may be a node of a different type than the second communication node, e.g., a terminal device.

In this way, the interaction of frequency band division information with the adjacent node via the interface message enables the adjacent node to circumvent frequency bands with high interference or intense competition based on the received resource indication and corresponding level, thus reducing resource competition between nodes.

In the implementation of the present disclosure, the level corresponding to the resource indication after division may include competition type, competition priority, service information, resource type, circumvention type, and reserved resource.

In an implementation, suppose that the second communication node has an M Hz bandwidth, which is divided by the second communication node into N parts. When the level corresponds to competition priority, the level may indicate the priority of the divided N parts of resources, e.g., high, medium, and low, or high and low. If the resources in a certain part are of high competition priority, it means that the part of resources can carry service data with high competition priority or strict latency requirements (e.g., URLLC); if the resources in a certain part are of medium competition priority, it means that the part of resources can carry service data with relatively high competition priority or relatively strict latency requirements; and if the resources in a certain part are of low competition priority, it means that the part of resources can carry service data with low competition priority or low latency requirements.

When the level corresponds to competition type, for example, Channel Access Priority Classes (CAPC)=1, CAPC=2, CAPC=3, and CAPC=4, which indicate that the divided N parts can carry service data corresponding to the competition type.

When the level corresponds to service information, for example, suppose that the resources carry two levels of services with different latency requirements, if the level corresponds to a service with strict latency requirements, it means that the part of resource can carry service data with strict latency requirements (such as URLLC); and if the level corresponds to a service with low latency requirements, it means that the part of resource can carry service data with low latency requirements.

When the level corresponds to resource type, the level may indicate the resource type of the divided N parts of resources, for example, high, medium, and low, or high and low. If the level corresponds to a high resource type, it means that the part of resources can carry service data with high priority, strict service latency requirements, high competition latency sensitivity, or high interference sensitivity; if the level corresponds to a medium resource type, it means that the part of resources can carry service data with medium priority, medium service latency requirements, medium competition latency sensitivity, or medium interference sensitivity; and if the level corresponds to a low resource type, it means that the part of resources can carry service data with low priority, low service latency requirements, low competition latency sensitivity, or low interference sensitivity.

When the level corresponds to circumvention type or reserved resource, the level may indicate whether each part of the divided N parts of resources are circumvented or reserved resources, for example, yes or no. If a part of resources are circumvented or reserved resources, it means that the part of resources can carry service data with high priority, strict service latency requirements, high competition latency sensitivity, or high interference sensitivity; otherwise, the part of resources cannot carry service data with high priority, strict service latency requirements, high competition latency sensitivity, or high interference sensitivity.

In this way, when sending data, the second communication node may send the data to different parts of resources according to the priority of the data, the type of LBT, or the quality of service (QoS) parameter, and so on.

In an implementation, the resource indication after division by the second communication node in step S1402 may include the following contents:

The first content: the resource indication includes a starting position, a bandwidth, and/or an ending position of each part of resources, and a level corresponding to each part of resources.

The bandwidth of each part may be expressed at a granularity of X Hz bandwidth, and each part may be a discontinuous frequency band or a continuous frequency band. For example, the second communication node has a 100 Hz bandwidth which is divided by the second communication node into 3 parts, with the 3 parts corresponding to levels a, b, and c, respectively, where a may correspond to the transmission for services with the highest priority or latency requirements or CAPC=1 and for signaling, b may correspond to the transmission for services with higher priority or latency requirements or CAPC=2, 3, and c may correspond to the transmission for services with the lowest priority or latency requirements or CAPC=4.

Suppose that the division is performed at a granularity of 20 MHz, then part 1 may be frequency domain resources with a starting position of 0, a bandwidth of 20 MHz, and an ending position of 19 MHz, which corresponds to level a, and it is used for the transmission of services with the highest priority or latency requirements or CAPC=1, as well as signaling; part 2 may be frequency domain resources with a starting position of 20 MHz, a bandwidth of 40 MHz, and an ending position of 59 MHz, which corresponds to level b, and it is used for the transmission of services with higher priority or higher latency requirements or CAPC=2, 3; and part 3 may be frequency domain resources with a starting position of 60 MHz, a bandwidth of 40 MHz, and an ending position of 99 MHz, which corresponds to level c, and it is used for the transmission of services with lowest priority or lowest latency requirements or CAPC=4.

Alternatively, suppose that the division is performed at a granularity of 100 RB, then part 1 as divided may be frequency domain resources with a starting position of 0, a bandwidth of 100 RB, and an ending position of 99 RB, which corresponds to level a; part 2 may be frequency domain resources with a starting position of 100 RB, a bandwidth of 200 RB, and an ending position of 299 RB, which corresponds to level b; and part 3 may be frequency domain resources with a starting position of 300 RB, a bandwidth of 200 RB, and an ending position of 499 RB, which corresponds to level c.

The above division process is described in further detail with a specific example below. Suppose that the second communication node has a 100 MHz bandwidth, which is divided into 2 parts corresponding to two different levels of 1 and 0, respectively, where 1 may correspond to the transmission for services with the highest priority or latency requirements, or CAPC=1 and for signaling, and 0 may correspond to the transmission for services with low priority or latency requirements, or services other than those with CAPC=1. Suppose that the division is performed at a granularity of 20 MHz, then part 1 as divided may be two sections of frequency domain resources with a starting position of 0, a bandwidth of 20 MHz, and an ending position of 19 MHz, and a starting position of 80 MHz, a bandwidth of 20 MHz, and an ending position of 99 MHz, respectively, both of which correspond to level 1; and part 2 may be frequency domain resources with a starting position of 20 MHz, a bandwidth of 60 MHz, and an ending position of 79 MHz, which corresponds to level 0. Alternatively, suppose that the division is performed at a granularity of 100 RB, then part 1 as divided may be two sections of frequency domain resources with a starting position of 0, a bandwidth of 100 RB (Subcarrier Spacing (SCS) of 15 KHz), and an ending position of 99 RB, and a starting position of 300 RB, a bandwidth of 100 RB (SCS of 15 KHz), and an ending position of 499 RB, respectively, both of which correspond to level 1; part 2 may be frequency domain resources with a starting position of 100 RB, a bandwidth of 300 RB, and an ending position of 299 RB, which corresponds to level 0.

The second content: the resource indication is represented by a character string, each character in the character string corresponding to the level of a resource part.

Each character in the character string indicates a level and corresponds to a bandwidth of X MHz. For example, suppose that the second communication node has a 100 MHz bandwidth which is divided into 3 parts, the 3 parts corresponding to three levels a, b, and c, respectively, where a may correspond to the transmission for services with the highest priority or latency requirements or CAPC=1 and for signaling, b may correspond to the transmission for services with higher priority or latency requirements or CAPC=2, 3, and c may correspond to the transmission for services with the lowest priority or latency requirements or CAPC=4.

Suppose that the resource division is performed at a granularity of 20 MHz, and the character string after division is abbca, then the divided resources 0-19 MHz and 80-99 MHz correspond to level a, 20-59 MHz correspond to level b, and 60-79 MHz correspond to level c. Accordingly, the above resources may be divided at a granularity of 100 RB.

Alternatively, the second communication node may divide the bandwidth into 2 parts at a granularity of 100 MHz, the 2 parts corresponding to levels 1 and 0, respectively, where 1 may correspond to the transmission for services with the highest priority or latency requirements or CAPC=1 and for signaling, and 0 may correspond to the transmission for services with low priority or latency requirements or services other than those with CAPC=1. Assuming that the resource division is performed at a granularity of 20 MHz, and the bit string after division is 10001, then the divided resources 0-19 MHz and 80-99 MHz correspond to level 1, and 20-79 MHz corresponds to level 0. Accordingly, the above resources may also be divided at a granularity of 100 RB.

It should be noted that the number of levels and the granularity of division involved in the above division process may be configured, or may be indicated by an interface message.

The third content: the resource indication indicates resources for each moment part within a first time as well as a corresponding level, where the first time may be a certain period of time, that is, the second communication node divides the moments within a certain period of time into N parts, each part corresponding to a level.

In an implementation, as mentioned above, the moments within a certain period of time are divided into N parts, then in this case, each part may include a starting time, a duration, an ending position, or a period of each moment part, as well as a level corresponding to each part; and each part may be divided at a granularity of multiple subframes, time slots, ms, and symbols, and each part may be a discontinuous time or a continuous time. The above certain period of time may be a fixed duration or a configured duration, and appears periodically in time in accordance with a certain period of time.

The above division manner is described in further detail below by way of example. Suppose that the second communication node divides a 10 ms time into 3 parts, the 3 parts corresponding to three levels of a, b and c, respectively, where a may correspond to the transmission for services with the highest priority or latency requirements or CAPC=1 and for signaling, b may correspond to the transmission for services with higher priority or latency requirements or CAPC=2, 3, and c may correspond to the transmission for services with the lowest priority or latency requirements or CAPC=4. Suppose that the division is performed at a 2 ms granularity, the moment part 1 as divided may be resources with a starting moment of 0, a duration of 2 ms, and a period of 4 ms, which corresponds to level a, for example, moments 0-1 ms, 4-5 ms, and 8-9 ms; moment part 2 may be resources with a starting moment of 2, a duration of 2 ms, and a period of 10 ms, which corresponds to level b, for example, moments 2-3 ms; and moment part 3 may be resources with a starting moment of 6, a duration of 2 ms, and a period of 10 ms, which corresponds to level c, for example, moments 6-7 ms.

Alternatively, the second communication node divides the above 10 ms time into 2 parts which correspond to levels 1 and 0, respectively, where 1 may correspond to the transmission for services with the highest priority or latency requirements or CAPC=1 and for signaling, and 0 may correspond to the transmission for services with low priority or latency requirements or services other than those with CAPC=1. Suppose that the division is performed at a 2 ms granularity, the moment part 1 as divided may be resources with a starting moment of 0, a duration of 2 ms, and a period of 4 ms, which corresponds to level 1, for example, moments 0-1 ms, 4-5 ms, and 8-9 ms; and moment part 2 may be resources with a starting moment of 2, a duration of 2 ms, and a period of 4 ms, which corresponds to level 0, for example, moments 2-3 ms and 6-7 ms.

Alternatively, after dividing the moments within a certain period of time into N parts, the division indication may be represented as a character string, each character therein indicating a level and corresponding to a certain duration. For example, suppose that the second communication node divides a 10 ms time into multiple parts, each part corresponding to one of the three levels a, b, and c, respectively, where a may correspond to the transmission for services with the highest priority or latency requirements or CAPC=1 and for signaling, b may correspond to the transmission for services with higher priority or latency requirements or CAPC=2, 3, and c may correspond to the transmission for services with the lowest priority or latency requirements or CAPC=4. Each part lasts 2 ms. Suppose that the character string is abacc, it may indicate that 0-1 ms and 4-5 ms correspond to level a, 2-3 ms corresponds to level b, and 6-9 ms corresponds to level c.

Alternatively, the second communication node divides the 10 ms time into 2 parts which correspond to levels 1 and 0, respectively, where 1 may correspond to the transmission for services with the highest priority or latency requirements or CAPC=1 and for signaling, and 0 may correspond to the transmission for services with low priority or latency requirements or services other than those with CAPC=1. Each part lasts 2 ms. Suppose that the character string is 10100, it may indicate that 0-1 ms and 4-5 ms correspond to level 1, and 2-3 ms and 6-9 ms correspond to level 0.

It should be noted that the above-mentioned certain period of time may appear periodically, for example, if the certain period of time is 10 ms, then each 10 ms periodically appears according to moment division information and is indicated by an interface message. In addition, the above number of levels, granularity, etc., may be configured, or may be indicated by an interface message.

The fourth content: the resource indication indicates the division of the bandwidth for each moment within the first time, and each part as divided includes a starting position, a bandwidth, an ending position of resources, as well as a level corresponding to each part of resources.

The bandwidth division may be different in each moment within a certain period of time. The second communication node may indicate a list of moments within a certain period of time, and the bandwidth within each moment is subdivided, and the resources as divided correspond to corresponding levels. The method of bandwidth division within each moment may be either the first or the second approach described above. For example, suppose that a certain period of time is 10 ms and the second communication node performs the division at a granularity of 2 ms, then a list of size 5 is required and the bandwidth is subdivided for each item in the list.

The fifth content: the resource indication indicates a division of the time corresponding to each part of frequency band resources, and each part as divided includes a starting time, a duration, an ending time or a period, as well as a level corresponding to each part of resources.

The second communication node divides the bandwidth into multiple parts and divides the time corresponding to each bandwidth part, and each part of resources as divided correspond to a corresponding level, where the division of the time corresponding to each bandwidth part may be performed using the third division approach described above. For example, part 1 as divided may be resources with a starting position of 0, a bandwidth of 20 MHz, and an ending position of 19 MHz, which corresponds to level a, and it occupies 0-1 ms, 4-5 ms, and 8-9 ms within the 10 ms.

Figure 16:
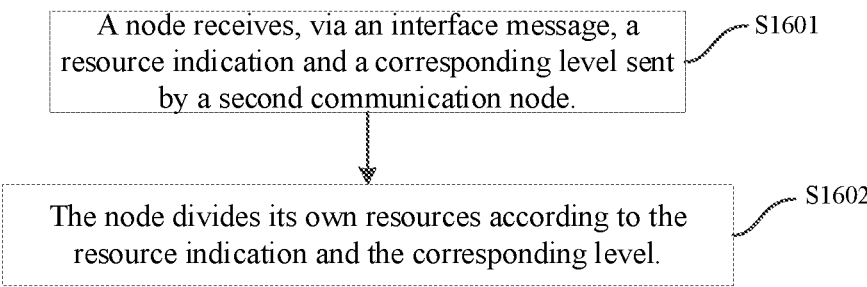
FIG. 16 is a flowchart of a resource determination method provided by an embodiment.

FIG. 16 is a flowchart of a resource determination method provided by an embodiment of the present disclosure. As shown in FIG. 16, the method includes the following steps.

At S1601, a node receives, via an interface message, a resource indication and a corresponding level sent by a second communication node.

The node in this step is a node of the same type as the second communication node. For example, suppose that both the node and the second communication node are base stations. The resource indication and the corresponding level received by the node are the indication and level after the second communication node divides the resources in accordance with the frequency domain approach and/or time domain approach.

At S1602, the node divides its own resources according to the resource indication and the corresponding level.

In an implementation, suppose that the second communication node divides the resources in accordance with the frequency domain approach, then the resource indication and the corresponding level received by the node are the resource indication and the corresponding level after the division in frequency domain, so that the node can divide its own frequency band according to the resource indication received from the second communication node, so as to avoid scheduling services with the highest priority or highest latency requirements to the same frequency band as the second communication node. For example, for the resource part for the second communication node with high priority, the node may not schedule services with strict latency requirements at the corresponding frequency band position; and for the resource part for the second communication node with low priority, the node may schedule services with strict latency requirements at the corresponding frequency band position. For example, for the frequency band for the second communication node with the highest priority or the frequency band corresponding to the highest level (e.g., corresponding to level a), the node may plan for a frequency band with low priority or corresponding to the low level; and for the frequency band for the second communication node with the lowest priority or the frequency band corresponding to the lowest level (e.g., corresponding to level c), the node may plan for a part of the frequency band with the highest priority or corresponding to the highest level.

In this way, by means of interaction of the resource division indication and the corresponding level, the node and the second communication node can circumvent frequency bands with high interference or intense competition, thereby reducing mutual competition between nodes.

Figure 17:
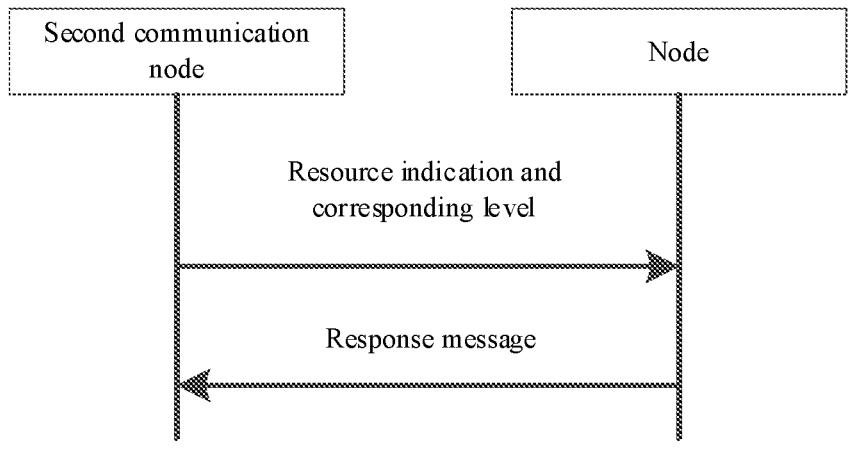
FIG. 17 is a schematic diagram of interaction between nodes provided by an embodiment.

Alternatively, as shown in FIG. 17, the node may reply with a response message after receiving the information on the resource indication and the corresponding level sent by the second communication node, and feed back its own resource division information to the second communication node to achieve the negotiation between the two nodes. Alternatively, the node may not feed back the information.

In an implementation, the resource indication received by the node may include a starting position, a bandwidth, and an ending position of each part of resources, as well as a level corresponding to each part of resources; or the resource indication is represented by a character string, each character in the character string corresponding to a level of a resource part; or the resource indication indicates resources for each moment part within the first time and a corresponding level.

The level corresponding to the resource indication may include competition type, competition priority, service information, resource type, circumvention type, and reserved resource.

Figure 18:
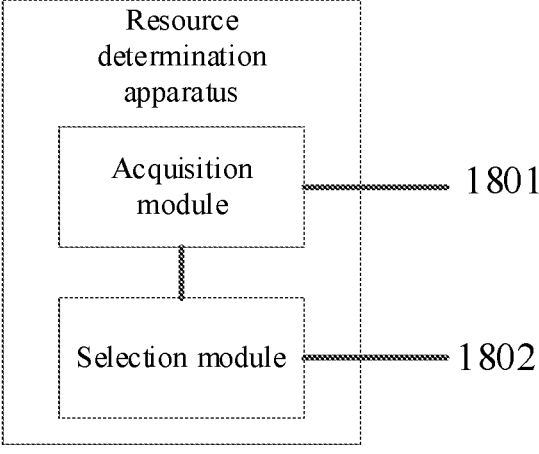
FIG. 18 is a schematic diagram of the structure of a resource determination apparatus provided by an embodiment.

FIG. 18 illustrates a resource determination apparatus provided by an embodiment of the present disclosure. As shown in FIG. 18, the apparatus includes: an acquisition module 1801 and a selection module 1802, where the acquisition module is configured to acquire configuration information configured by a second communication node;

and the selection module is configured to select a target resource among a plurality of pre-configured resources according to the configuration information, where the pre-configured resources are time and frequency domain resources configured by the second communication node.

Alternatively, the above configuration information may include initial transmission configuration information and/or retransmission configuration information.

In an implementation, the initial transmission configuration information includes any one of: information indicating whether to enable the resource determination apparatus to select the target resource; or information enabling the resource determination apparatus to select the target resource, and to select a frequency domain resource with minimum interference; or information indicating selection of the target resource based on a competition mechanism; or information instructing the resource determination apparatus to select the target resource based on parameter information, where the parameter information includes any one of a resource determination apparatus identifier, a cell identifier, a random number, and frequency band information.

In an implementation, the retransmission configuration information includes: information enabling the resource determination apparatus to select the target resource, and to select a target resource with minimum interference based on a retransmitted data packet TBS; or information enabling selection of the target resource for retransmission according to a timer and a retransmitted data packet TBS; or information enabling selection of the target resource for retransmission according to a pre-configured resource attribute, where the pre-configured resource attribute is a preemption priority or whether to allow occupancy.

Figure 19:
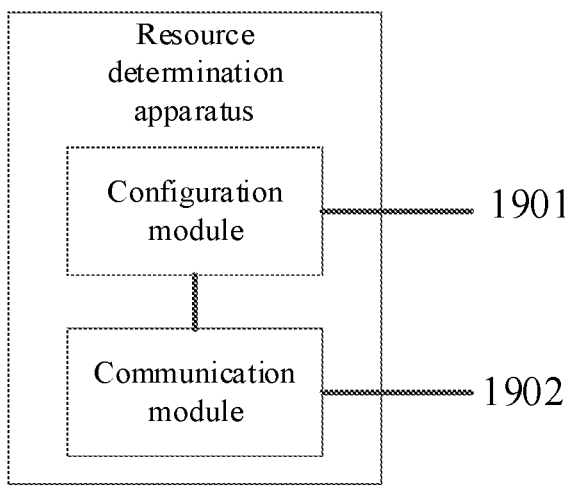
FIG. 19 is a schematic diagram of the structure of a resource determination apparatus provided by an embodiment.

FIG. 19 illustrates a resource determination apparatus provided by an embodiment of the present disclosure. As shown in FIG. 19, the apparatus includes: a configuration module 1901 and a communication module 1902, where the configuration module is configured to configure a plurality of pre-configured resources and configuration information, the pre-configured resources being configured time and frequency domain resources; and the communication module is configured to send the configuration information to a first communication node, where the configuration information is used to instruct the first communication node to select a target resource among the plurality of pre-configured resources according to the configuration information.

Alternatively, the configuration information includes initial transmission configuration information and/or retransmission configuration information.

In an implementation, the initial transmission configuration information includes any one of: information indicating whether to enable the first communication node to select the target resource; or information enabling the first communication node to select the target resource, and to select a frequency domain resource with minimum interference; or information indicating selection of the target resource based on a competition mechanism; or information instructing the first communication node to select the target resource based on parameter information, where the parameter information includes any one of a first communication node identifier, a cell identifier, a random number, or frequency band information.

In an implementation, the retransmission configuration information includes any one of: information enabling the first communication node to select the target resource, and to select a target resource with minimum interference based on a retransmitted data packet TBS; or information enabling selection of the target resource for retransmission according to a timer and a retransmitted data packet TBS; or information enabling selection of the target resource for retransmission according to a pre-configured resource attribute, where the pre-configured resource attribute is a preemption priority or whether to allow occupancy.

Figure 20:
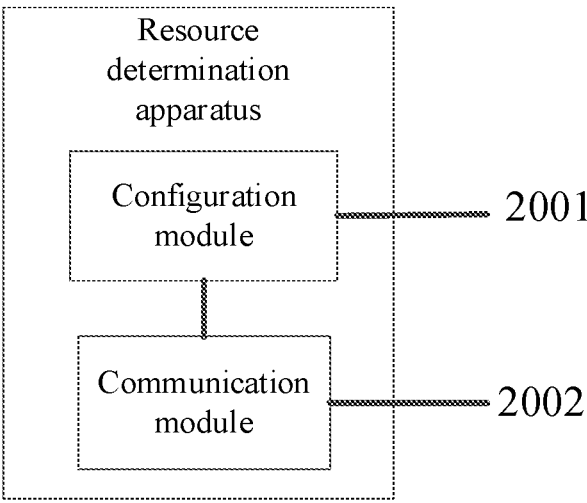
FIG. 20 is a schematic diagram of the structure of a resource determination apparatus provided by an embodiment.

FIG. 20 illustrates a resource determination apparatus provided by an embodiment of the present disclosure. As shown in FIG. 20, the apparatus includes: a configuration module 2001 and a communication module 2002, where the configuration module is configured to configure a plurality of pre-configured resources; and the communication module is configured to send signaling to a first communication node, where the above first communication node is a plurality of nodes configured on the pre-configured resources, and the signaling is configured to instruct the plurality of first communication node to de-activate and/or activate a specified resource.

Alternatively, the signaling may be a common PDCCH, where the common PDCCH carries configuration information for activation, and/or configuration information for de-activation; or the common PDCCH carries a first communication node identifier, configuration information for activation, and/or configuration information for de-activation.

Figure 21:
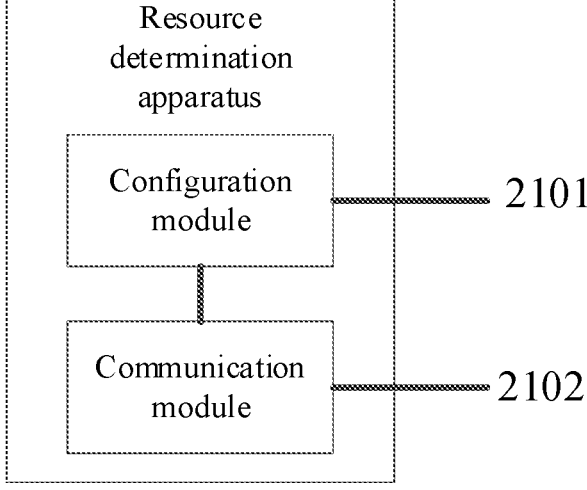
FIG. 21 is a schematic diagram of the structure of a resource determination apparatus provided by an embodiment.

FIG. 21 illustrates a resource determination apparatus provided by an embodiment of the present disclosure. As shown in FIG. 21, the apparatus includes: a configuration module 2101 and a communication module 2102, where the configuration module is configured to configure a plurality of pre-configured resources and indication information; and the communication module is configured to send the indication information to a first communication node, where the number of the first communication nodes may be a plurality, that is, the indication information may be used to instruct the plurality of first communication nodes to compete for a frequency domain resource among the plurality of pre-configured resources according to the indication information.

In an implementation, the indication information may include: a competition priority, or whether to reduce the competition level, or whether to delay competition, or whether to cancel sending or to be silent, or whether to generate a random number.

Figure 22:
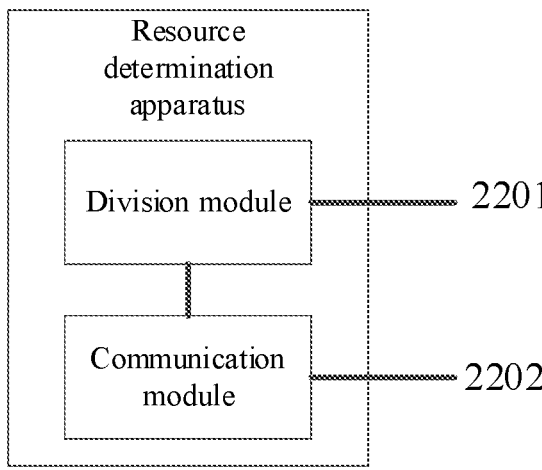
FIG. 22 is a schematic diagram of the structure of a resource determination apparatus provided by an embodiment.

FIG. 22 illustrates a resource determination apparatus provided by an embodiment of the present disclosure. As shown in FIG. 22, the apparatus includes: a division module 2201 and a communication module 2202, where the division module is configured to divide resources; and the communication module is configured to send, via an interface message, a resource indication and a corresponding level to an adjacent node, where the adjacent node is a node of the same type as the resource determination apparatus.

In an implementation, the resource indication may include a starting position, a bandwidth, and/or an ending position of each part of the resources, and a level corresponding to each part of the resources; or the resource indication is represented by a character string, each character in the character string corresponding to a level of a resource part; or the resource indication indicates resources for each moment part within the first time and a corresponding level.

Here, the level corresponding to the resource indication includes competition type, competition priority, service information, resource type, circumvention type, and reserved resource.

Figure 23:
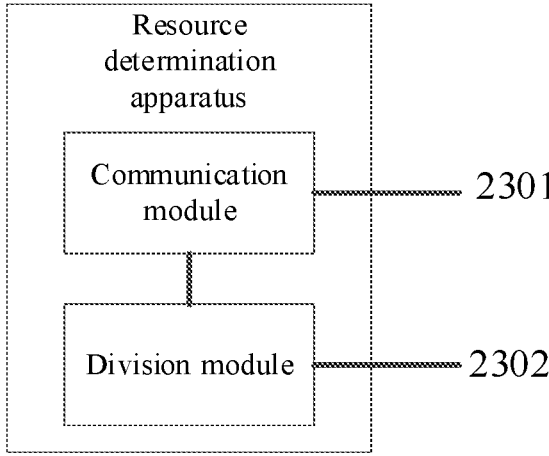
FIG. 23 is a schematic diagram of the structure of a resource determination apparatus provided by an embodiment.

FIG. 23 illustrates a resource determination apparatus provided by an embodiment of the present disclosure. As shown in FIG. 23, the apparatus includes: a communication module 2301 and a division module 2302, where the communication module is configured to receive, via an interface message, a resource indication and a corresponding level sent by a second communication node, where the second communication node is a node of the same type as the above resource determination apparatus; and the division module is configured to divide resources of the resource determination apparatus according to the resource indication and the corresponding level.

In an implementation, the resource indication includes a starting position, a bandwidth, and/or an ending position of each part of resources, and a level corresponding to each part of resources; or the resource indication is represented by a character string, each character in the character string corresponding to a level of a resource part; or the resource indication indicates resources for each moment part within the first time and a corresponding level.

Here, the level corresponding to the resource indication includes competition type, competition priority, service information, resource type, circumvention type, and reserved resource.

Figure 24:
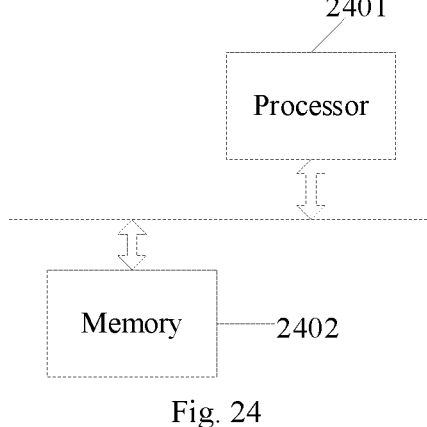
FIG. 24 is a schematic diagram of a node structure provided by an embodiment.

FIG. 24 is a schematic diagram of a node provided by an embodiment. As shown in FIG. 24, the node includes a processor 2401 and a memory 2402. There may be one or more processors 2401 in the node, and one processor 2401 is shown as an example in FIG. 24. The processor 2401 and the memory 2402 in the node may be connected by a bus or by other means. In FIG. 24, the connection is realized by a bus as an example.

Memory 2402, as a computer-readable storage medium, may be used to store software programs, computer-executable programs, and modules, such as the program instructions/modules (e.g., the acquisition module 1801, the selection module 1802, etc., in the resource determination apparatus) corresponding to the resource determination method in the embodiments of FIGS. 4, 7, and 9 of the present disclosure. The processor 2401 implements the above resource determination method by running the software programs, instructions and modules stored in the memory 2402.

The memory 2402 may mainly include a storage program area and a storage data area, where the storage program area may store an operating system and application program(s) required by at least one function, and the storage data area may store data created according to the use of a node, etc. In addition, the memory 2402 may include a high-speed random access memory and a non-volatile memory, for example, at least one magnetic disk storage device, a flash memory device, or another non-volatile solid-state storage device.

Figure 25:
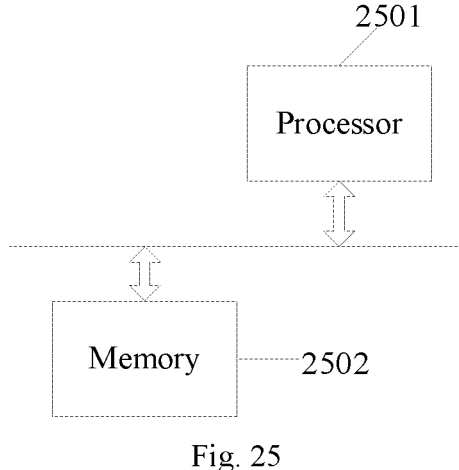
FIG. 25 is a schematic diagram of a node structure provided by an embodiment.

FIG. 25 is a schematic diagram of a node provided by an embodiment. As shown in FIG. 25, the node includes a processor 2501 and a memory 2502. There may be one or more processors 2501 in the node, and one processor 2501 is shown as an example in FIG. 25. The processor 2501 and the memory 2502 in the node may be connected by a bus or by other means. In FIG. 25, the connection is realized by a bus as an example.

Memory 2502, as a computer-readable storage medium, may be used to store software programs, computer-executable programs, and modules, such as the program instructions/modules (e.g., the configuration module 1901, the communication module 1902, etc., in FIG. 19) corresponding to the resource determination method in the embodiments of FIGS. 11, 12, 13, and 14 of the present disclosure. The processor 2501 implements the above resource determination method by running the software programs, instructions and modules stored in the memory 2502.

The memory 2502 may mainly include a storage program area and a storage data area, where the storage program area may store an operating system and application program(s) required by at least one function, and the storage data area may store data created according to the use of a node, etc. In addition, the memory 2502 may include a high-speed random access memory and a non-volatile memory, for example, at least one magnetic disk storage device, a flash memory device, or another non-volatile solid-state storage device.

Figure 26:
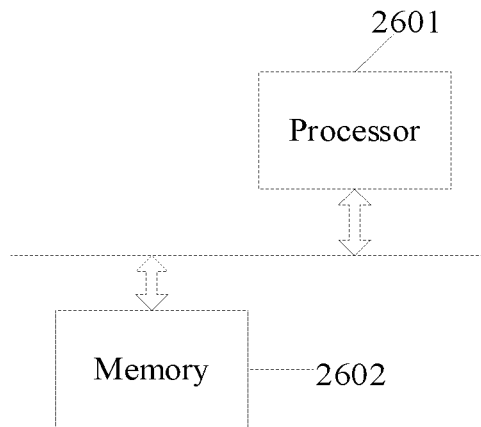
FIG. 26 is a schematic diagram of a node structure provided by an embodiment.

FIG. 26 is a schematic diagram of a node provided by an embodiment. As shown in FIG. 26, the node includes a processor 2601 and a memory 2602. There may be one or more processors 2601 in the node, and one processor 2601 is shown as an example in FIG. 26. The processor 2601 and the memory 2602 in the node may be connected by a bus or by other means. In FIG. 26, the connection is realized by a bus as an example.

Memory 2602, as a computer-readable storage medium, may be used to store software programs, computer-executable programs, and modules, such as the program instructions/modules (e.g., the communication module 2301, the division module 2302, etc., in FIG. 23) corresponding to the resource determination method in the embodiments of FIG. 16 of the present disclosure. The processor 2601 implements the above resource determination method by running the software programs, instructions and modules stored in the memory 2602.

The memory 2602 may mainly include a storage program area and a storage data area, where the storage program area may store an operating system and application program(s) required by at least one function, and the storage data area may store data created according to the use of a node, etc. In addition, the memory 2602 may include a high-speed random access memory and a non-volatile memory, for example, at least one magnetic disk storage device, a flash memory device, or another non-volatile solid-state storage device.

A further embodiment of the present disclosure provides a storage medium containing computer-executable instructions, where the computer-executable instructions, when executed by a computer processor, are used to perform a resource determination method according to any one of the embodiments of the present disclosure.

The above-described embodiments are only example embodiments of the present disclosure, and are not intended to limit the scope of protection of the present disclosure.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a resource determination apparatus executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A resource determination method, comprising:

acquiring, by a first communication node, configuration information configured by a second communication node; and selecting, by the first communication node, a target resource among a plurality of pre-configured resources according to the configuration information, wherein the pre-configured resources are time and frequency domain resources configured by the second communication node;

wherein the configuration information comprises initial transmission configuration information;

wherein the initial transmission configuration information comprises:

information enabling the first communication node to select the target resource, and to select a resource with minimum interference;

wherein the first communication node performs a separate measurement on each sub-band and obtains an interference strength and a channel occupancy rate for each sub-band;

in response to the interference strength of a sub-band is less than a corresponding threshold value and the channel occupancy rate is below a corresponding threshold value, the first communication node determines that the interference on the sub-band is small and then selects a resource on the sub-band; or in response to the interference strength of a sub-band is less than a corresponding threshold value and the channel occupancy rate is below a corresponding threshold value, and the interference strength value is minimum or the channel occupancy rate value is minimum, the first communication node determines that the interference on the sub-band is small and then selects a resource on the sub-band.

2. The method of claim 1, wherein the configuration information further comprises retransmission configuration information, and the retransmission configuration information comprises:

information enabling the first communication node to select the target resource, and to select a target resource with minimum interference based on a retransmitted data packet transport block size (TBS); or information enabling selection of the target resource for retransmission according to a pre-configured resource attribute, wherein the pre-configured resource attribute is a preemption priority or whether to allow occupancy.

3. A resource determination method, comprising:

configuring, by a second communication node, a plurality of pre-configured resources;

configuring, by the second communication node, configuration information or indication information; and sending, by the second communication node, the configuration information or the indication information to a first communication node;

wherein:

the pre-configured resources are configured time and frequency domain resources; the configuration information is used to instruct the first communication node to select a target resource among the plurality of pre-configured resources according to the configuration information; the configuration information comprises initial transmission configuration information; the initial transmission configuration information comprises: information enabling the first communication node to select the target resource, and to select a frequency domain resource with minimum interference; wherein the first communication node performs a separate measurement on each sub-band and obtains an interference strength and a channel occupancy rate for each sub-band; in response to the interference strength of a sub-band is less than a corresponding threshold value and the channel occupancy rate is below a corresponding threshold value, the first communication node determines that the interference on the sub-band is small and then selects a resource on the sub-band; or in response to the interference strength of a sub-band is less than a corresponding threshold value and the channel occupancy rate is below a corresponding threshold value, and the interference strength value is minimum or the channel occupancy rate value is minimum, the first communication node determines that the interference on the sub-band is small and then selects a resource on the sub-band; or the indication information is used to instruct the first communication node to compete for a frequency domain resource among the plurality of pre-configured resources according to the indication information; the indication information comprises: a competition priority, wherein in response to the first communication node being configured with a low competition priority, the competition is delayed during the competition for a channel, and the delay time is specified by the second communication node, or whether to delay competition, wherein after acquiring the indication information, the first communication node delays for a certain period of time before competing for a channel according to the indication information, and the delay time is specified by the second communication node.

4. The method of claim 3, wherein the configuration information further comprises retransmission configuration information, and the retransmission configuration information comprises one of:

information enabling the first communication node to select the target resource, and to select a target resource with minimum interference based on a retransmitted data packet transport block size (TBS); or

information enabling selection of the target resource for retransmission according to a pre-configured resource attribute, wherein the pre-configured resource attribute is a preemption priority or whether to allow occupancy.

5. A node, comprising:

a memory, a processor, and a computer program stored on the memory and executable by the processor, wherein the computer program, when executed by the processor, causes the processor to implement the resource determination method of claim 1.

6. A non-transitory computer-readable storage medium storing a computer program, wherein the computer program, when executed by a processor, causes the processor to implement the resource determination method of claim 1.

7. A non-transitory computer-readable storage medium storing a computer program, wherein the computer program, when executed by a processor, causes the processor to implement the resource determination method of claim 3.

8. A node, comprising:

a memory, a processor, and a computer program stored on the memory and executable by the processor, wherein the computer program, when executed by the processor, causes the processor to implement the resource determination method of claim 3.

* * * * *